United States Patent
Gunnarsson et al.

(10) Patent No.: US 9,883,341 B2
(45) Date of Patent: Jan. 30, 2018

(54) WIRELESS DEVICE, A RADIO NETWORK NODE, A NETWORK NODE AND METHODS THEREIN

(71) Applicant: Telefonaktiebolaget L M Ericsson (publ), Stockholm (SE)

(72) Inventors: Fredrik Gunnarsson, Linköping (SE); Åke Busin, Sollentuna (SE); Sara Modarres Razavi, Linköping (SE); Henrik Rydén, Linköping (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 14/902,527

(22) PCT Filed: Dec. 14, 2015

(86) PCT No.: PCT/SE2015/051339
§ 371 (c)(1),
(2) Date: Dec. 31, 2015

(87) PCT Pub. No.: WO2016/122368
PCT Pub. Date: Aug. 4, 2016

(65) Prior Publication Data
US 2016/0227370 A1  Aug. 4, 2016

Related U.S. Application Data

(60) Provisional application No. 62/109,803, filed on Jan. 30, 2015.

(51) Int. Cl.
*H04W 24/00* (2009.01)
*H04W 4/02* (2009.01)
(Continued)

(52) U.S. Cl.
CPC .......... *H04W 4/023* (2013.01); *H04W 4/027* (2013.01); *H04W 48/16* (2013.01); *H04W 48/12* (2013.01)

(58) Field of Classification Search
USPC ...................................... 455/456.2
See application file for complete search history.

(56) References Cited

U.S. PATENT DOCUMENTS 6,298,306 B1 * 10/2001 Suarez .................. G01S 5/0018
701/300
8,565,781 B2 * 10/2013 Nilsson ............. G06F 17/30241
455/456.1
(Continued)

FOREIGN PATENT DOCUMENTS

WO  2011142715 A1  11/2011

OTHER PUBLICATIONS

3GPP, "3rd Generation Partnership Project; Technical Specification Group Core Network; Universal Geographical Area Description (GAD) (Release 6)", 3GPP TS 23.032 V6.0.0, Dec. 2004, 1-29.
(Continued)

*Primary Examiner* — Joel Ajayi
(74) *Attorney, Agent, or Firm* — Murphy, Bilak & Homiller, PLLC

(57) ABSTRACT

A wireless device (304) and a method therein for providing location information to a Radio Network Node, RNN, (306) or a Network Node, NN, (308,310). The wireless device, the RNN and the NN are operating in a wireless communications network (300). The wireless device receives, from the RNN or the NN, a request for Beacon Location Information, BLI. The wireless device obtains BLI from a beacon, wherein the BLI comprises information relating to a location
(Continued)

Method performed by wireless device 304 of the beacon, which beacon is located in reach by the wireless device. The wireless device transmits the obtained BLI to the RNN or the NN.

42 Claims, 14 Drawing Sheets

(51) Int. Cl.
*H04W 48/16* (2009.01)
*H04W 48/12* (2009.01)

(56) References Cited

U.S. PATENT DOCUMENTS

| 2005/0136845 | A1 | 6/2005 | Masuoka et al. |
|---|---|---|---|
| 2010/0109864 | A1 | 5/2010 | Haartsen et al. |
| 2012/0184292 | A1 | 7/2012 | Lin et al. |
| 2013/0324154 | A1 | 12/2013 | Raghupathy et al. |

OTHER PUBLICATIONS

3GPP, "3rd Generation Partnership Project; Technical Specification Group Radio Access Network; Evolved Universal Terrestrial Radio Access Network (E-UTRAN); Stage 2 functional specification of User Equipment (UE) positioning in E-UTRAN (Release 12)", 3GPP TS 36.305 V12.2.0, Dec. 2014, 1-59.

Unknown, Author, "Introduction of PRS-based Terrestrial Beacon Systems", Qualcomm Incorporated, 3GPP TSG-RAN WG2 Meeting #92, R2-156119, Anaheim, CA, USA, Nov. 16-20, 2015, 1-12.

Unknown, Author, "Text Proposal and Discussion on Further Enhancements to WiFi/BT Based Positioning", Ericsson, 3GPP TSG RAN WG1 Meeting #82, R1-153746, Beijing, China, Aug. 24-28, 2015, 1-4.

\* cited by examiner

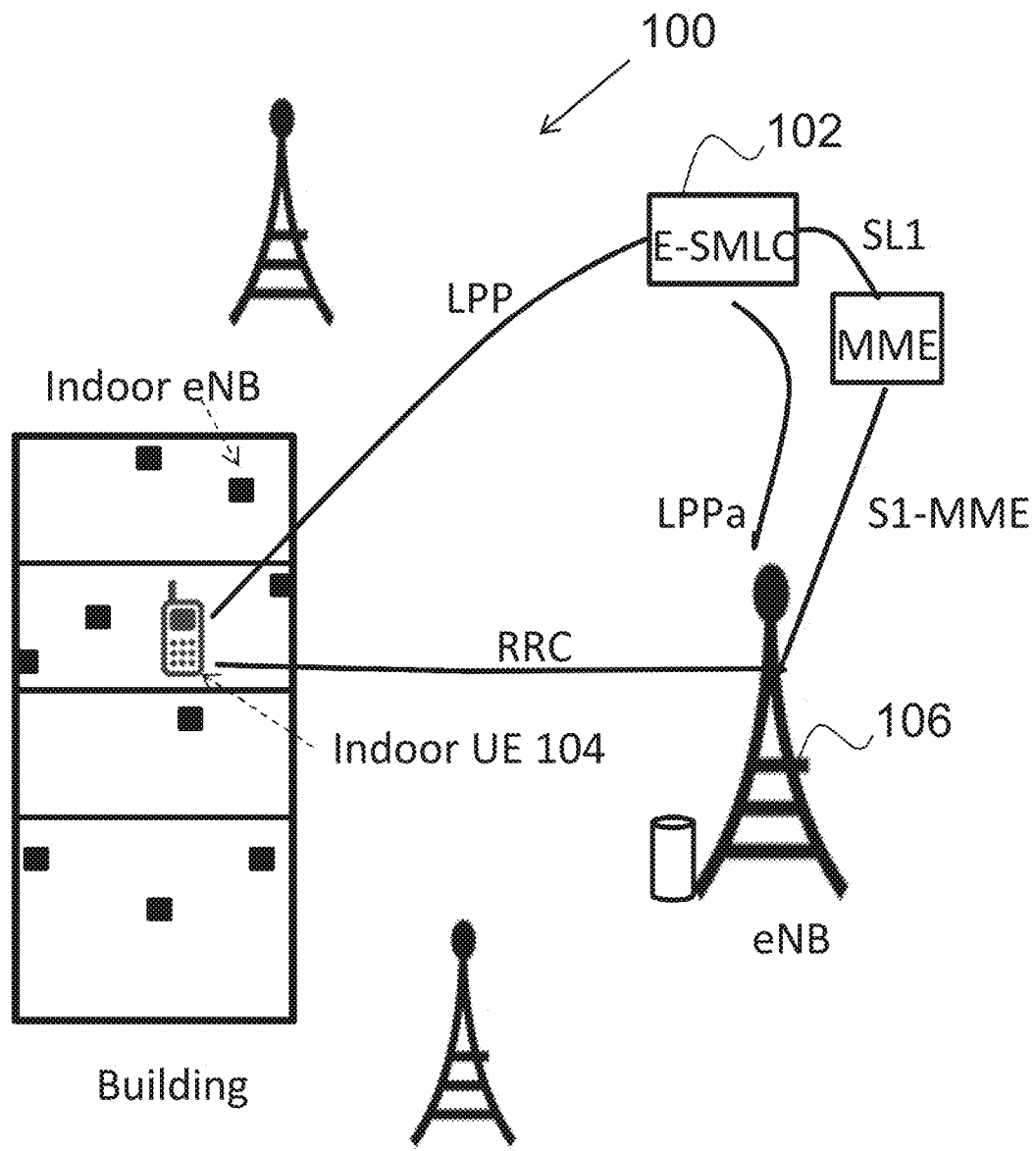
Figure 1 Exemplifying positioning architecture
(prior art)

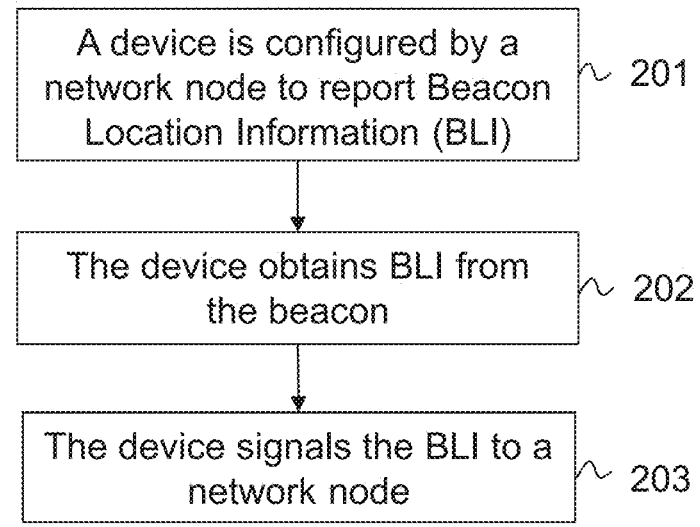
Figure 2 Method according to some embodiments
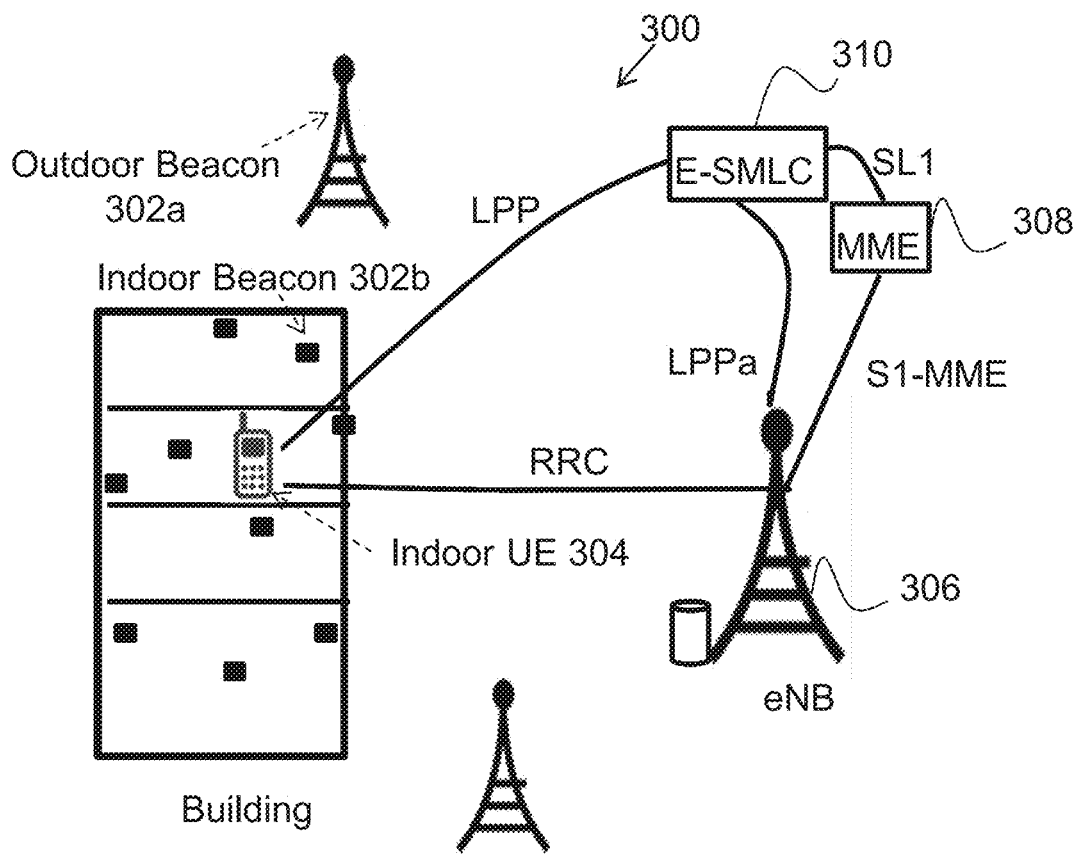
Figure 3a

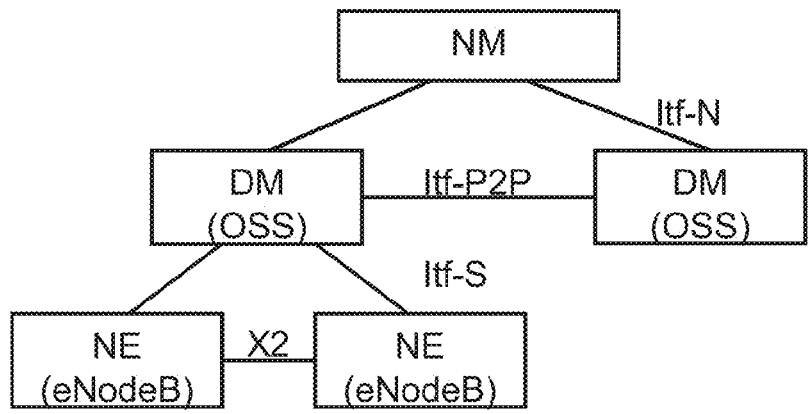
Figure 3b Example of embodiments of a management architecture
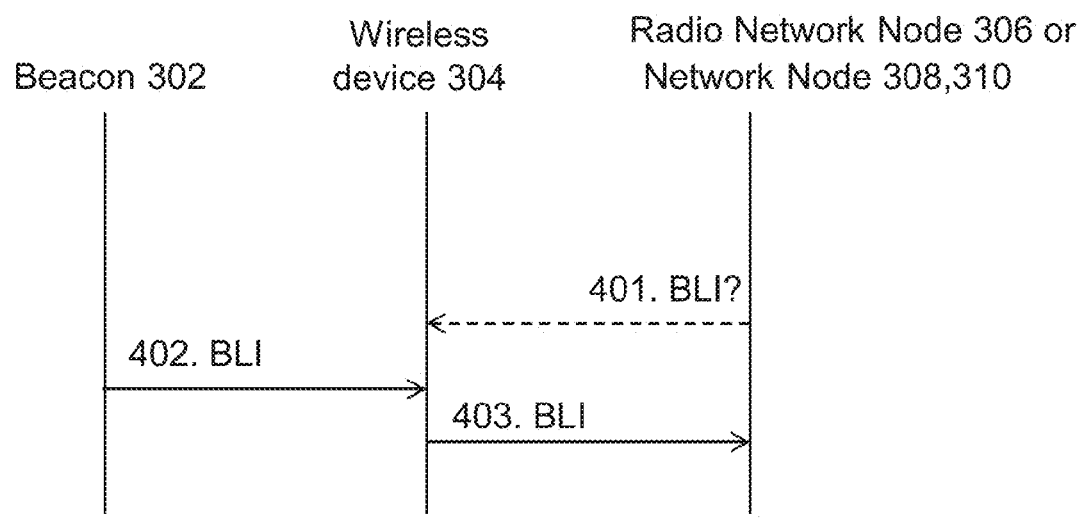
Figure 4 Signaling chart according to some embodiments

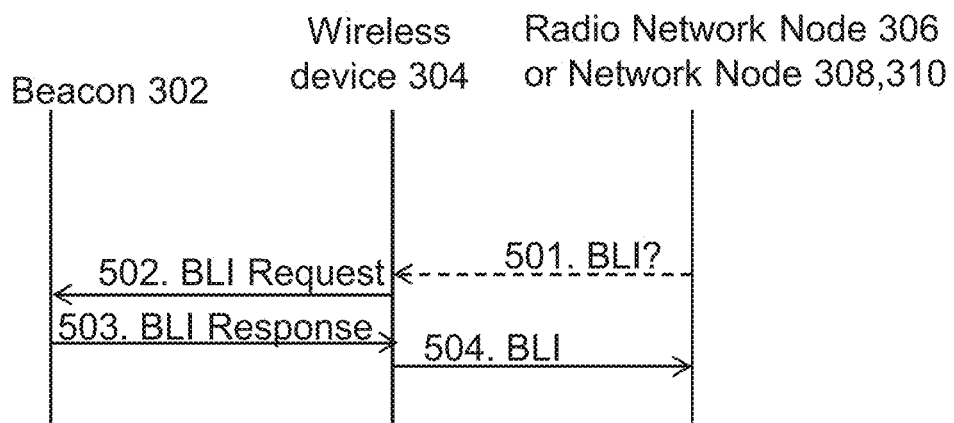
Figure 5 Alternative provision of beacon location information based on a request-response procedure.
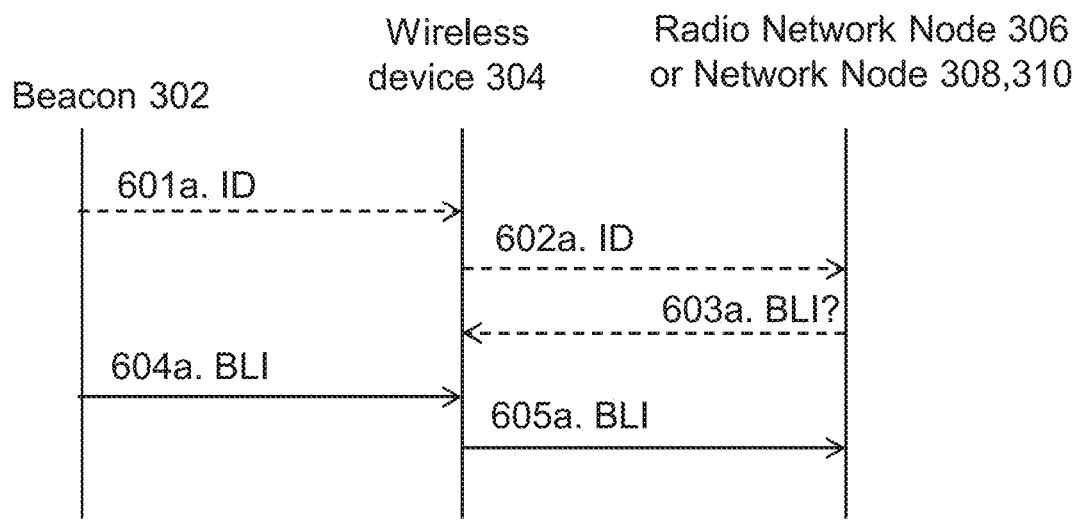
Figure 6a Beacon location information is retrieved upon request from the network node

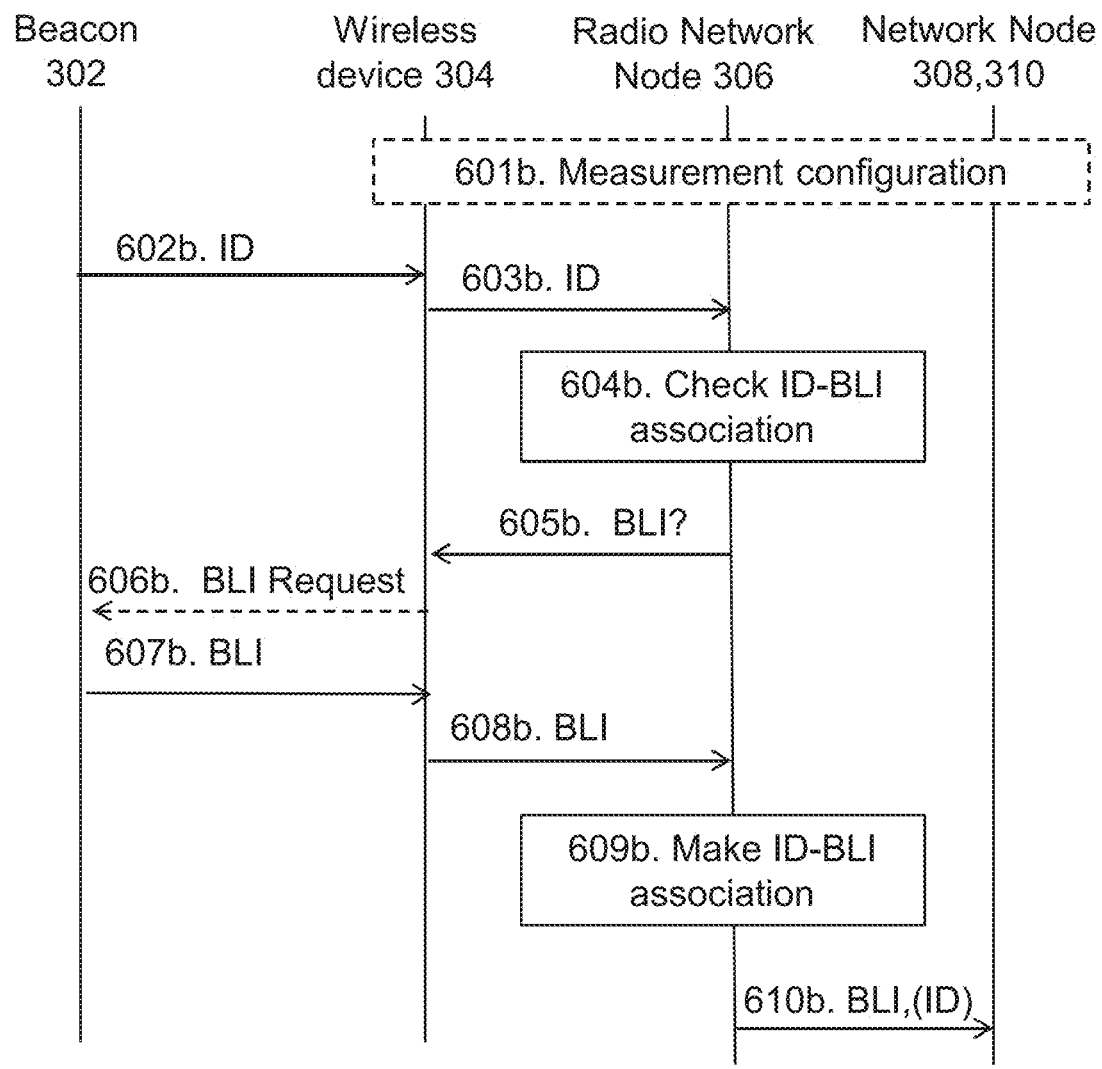
Figure 6b Beacon location information is retrieved upon request from the radio network node

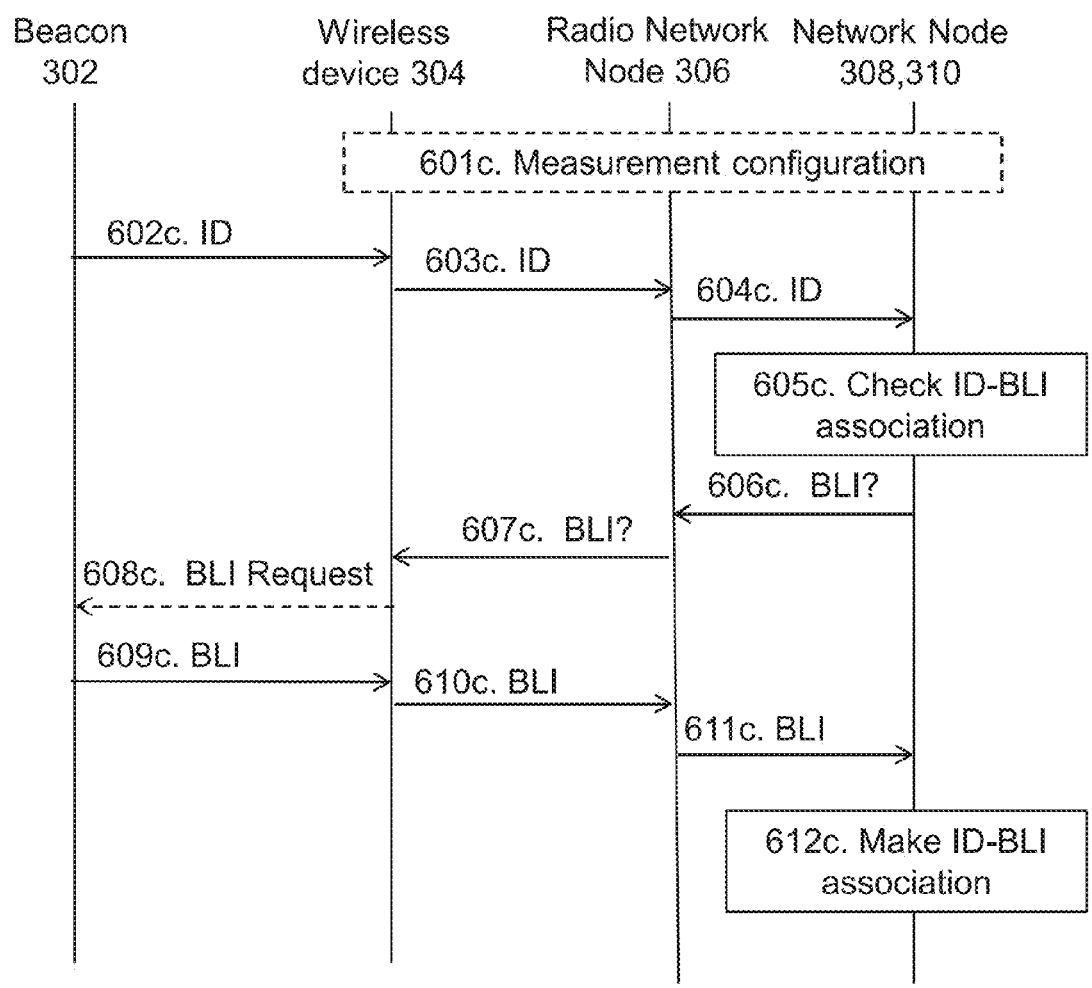
Figure 6c Beacon location information is retrieved upon request from the network node via the radio network node

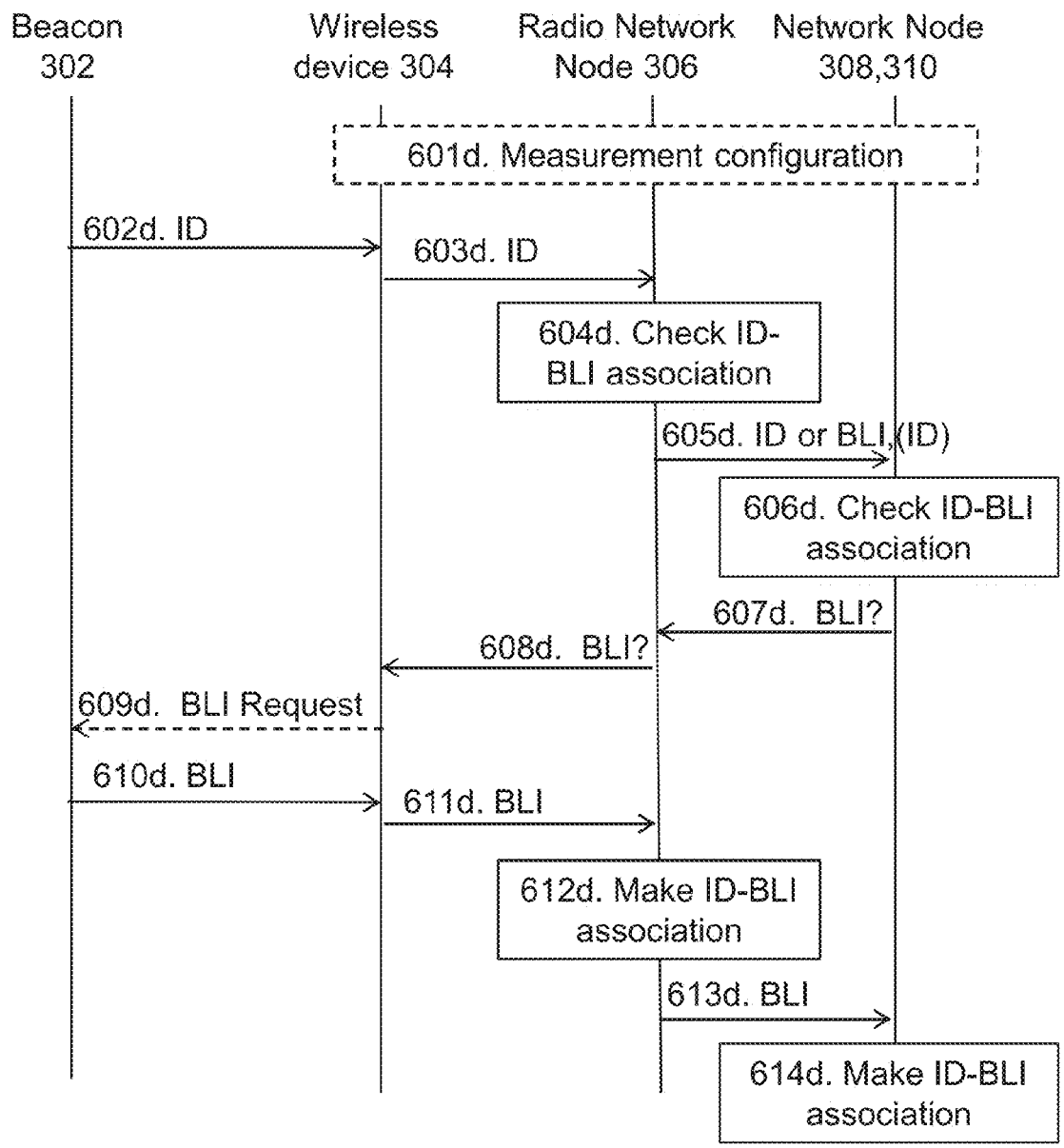
Figure 6d Beacon location information is retrieved upon request
from the network node via the radio network node,
and BLI-ID associations in both node types

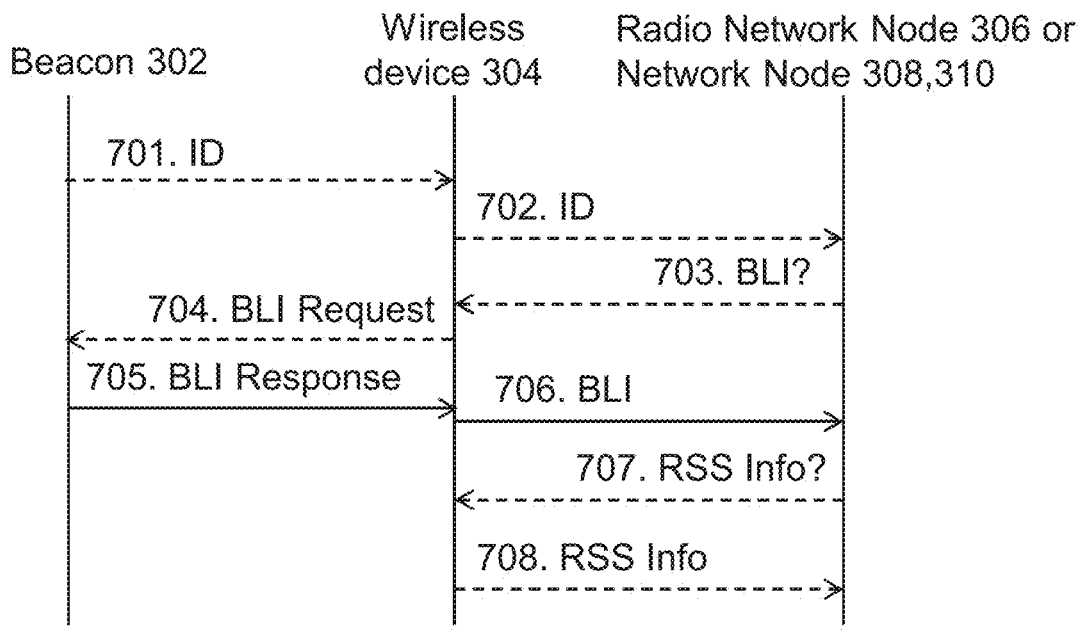
Figure 7 Beacon location information retrieval procedure including reporting of RSS
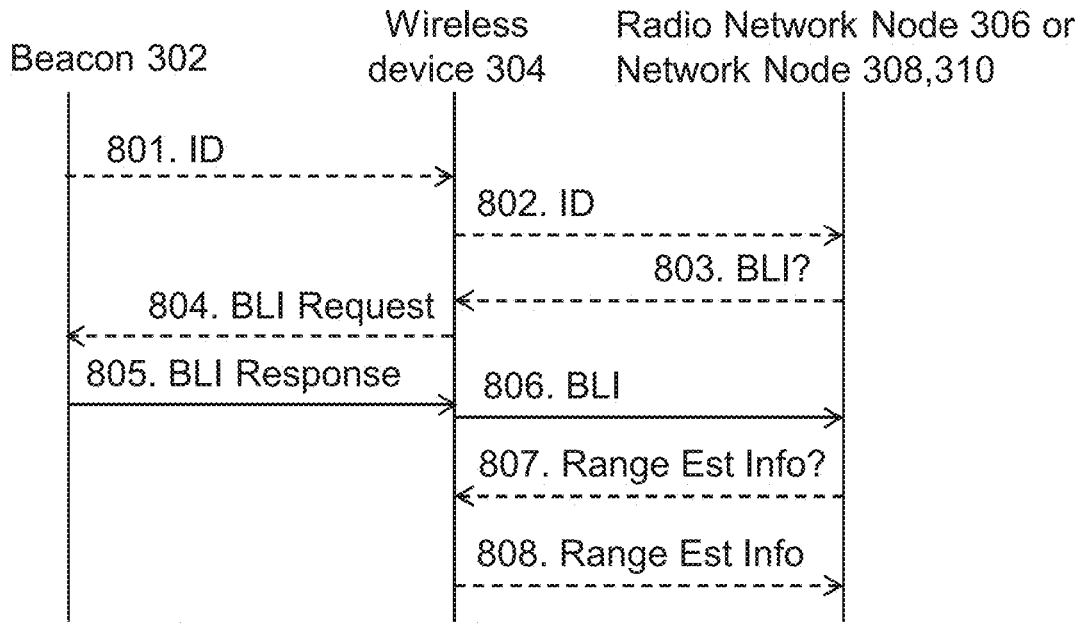
Figure 8 Beacon location information retrieval procedure including reporting of range estimation

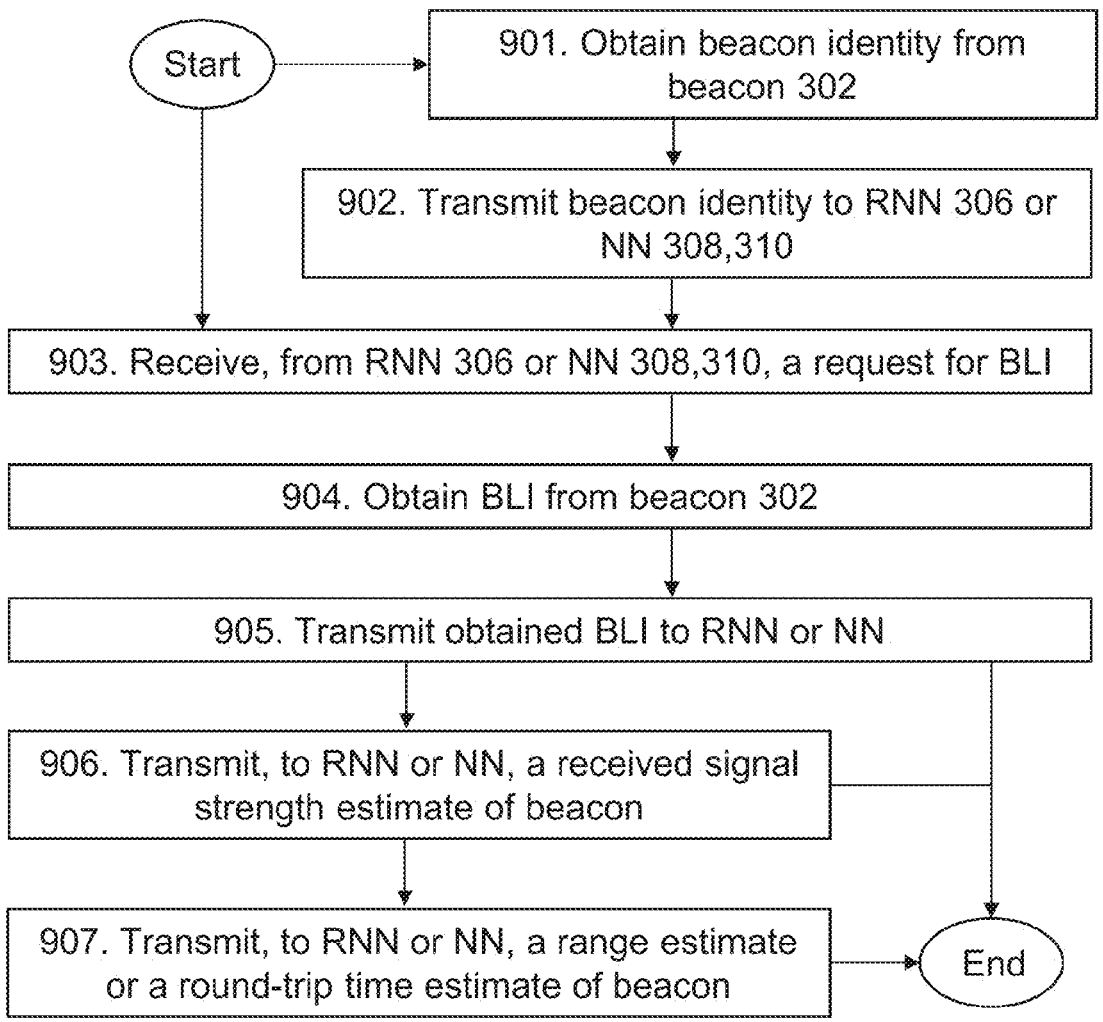
Figure 9 Method performed by wireless device 304

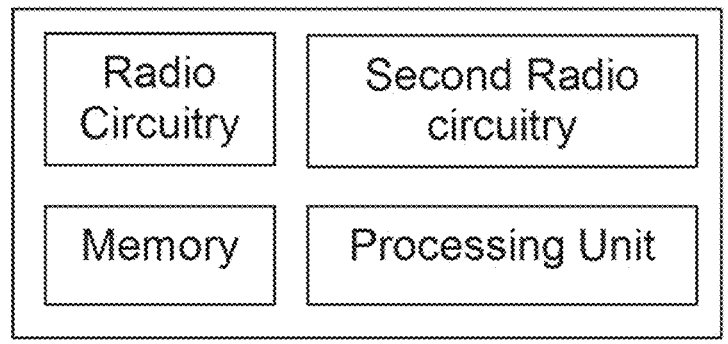
Figure 10a Exemplifying embodiment of the wireless device 304
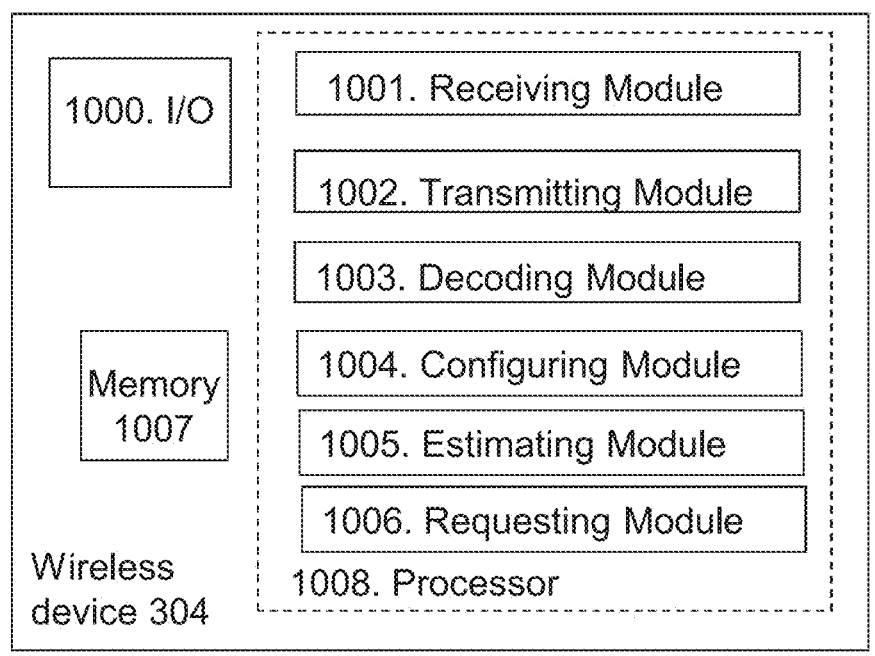
Figure 10b Exemplifying embodiment of the wireless device 304

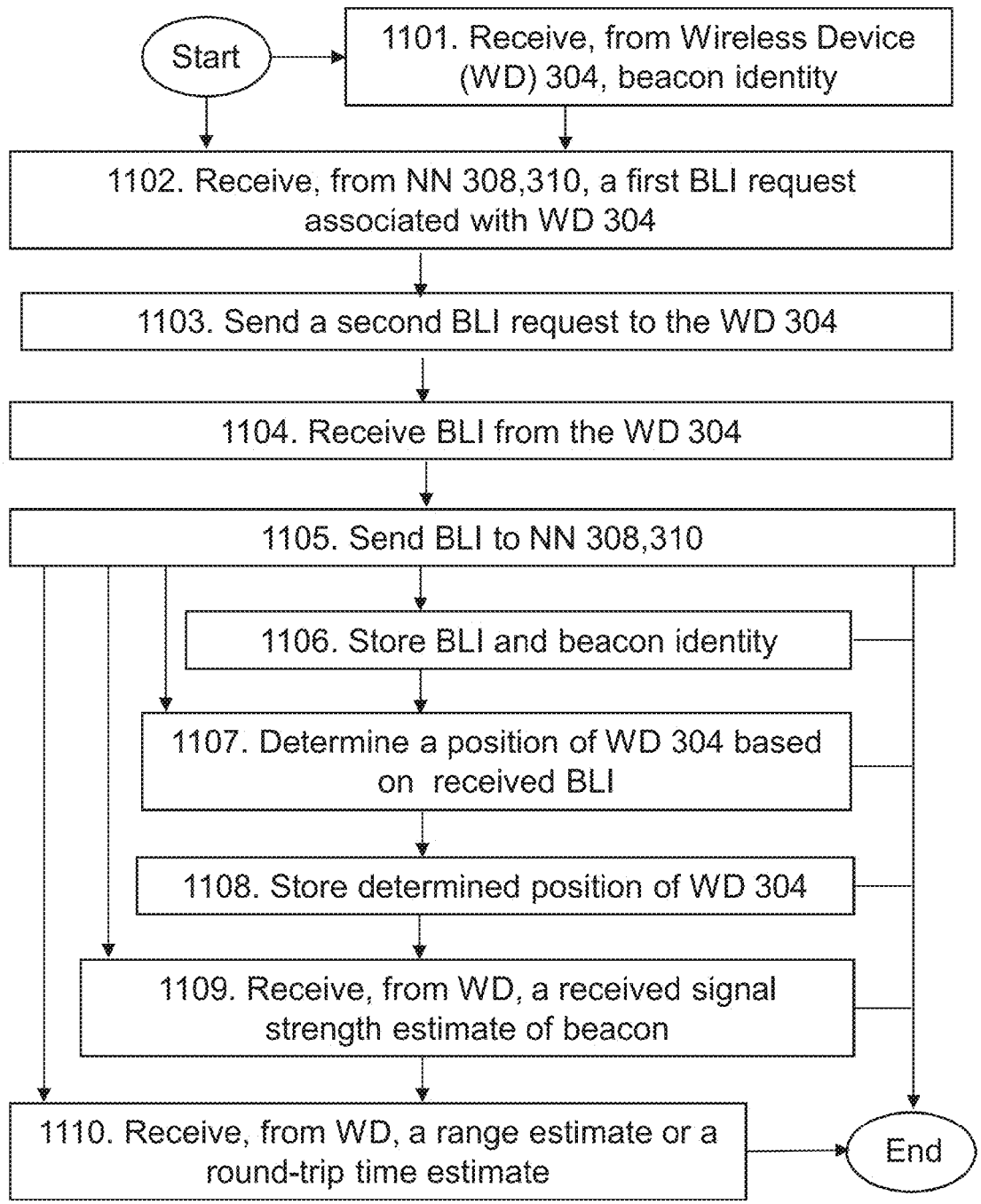
Figure 11 Method performed by Radio Network Node 306

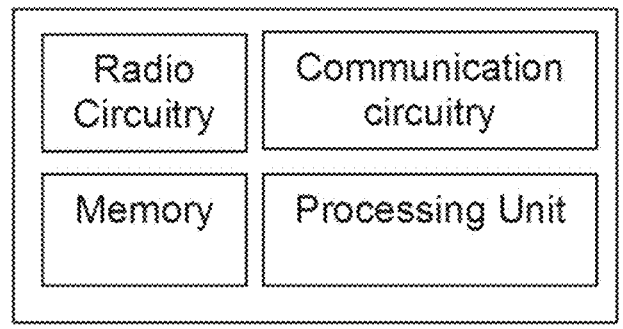
Figure 12a Exemplifying embodiment of the
Radio Network Node (RNN) 306
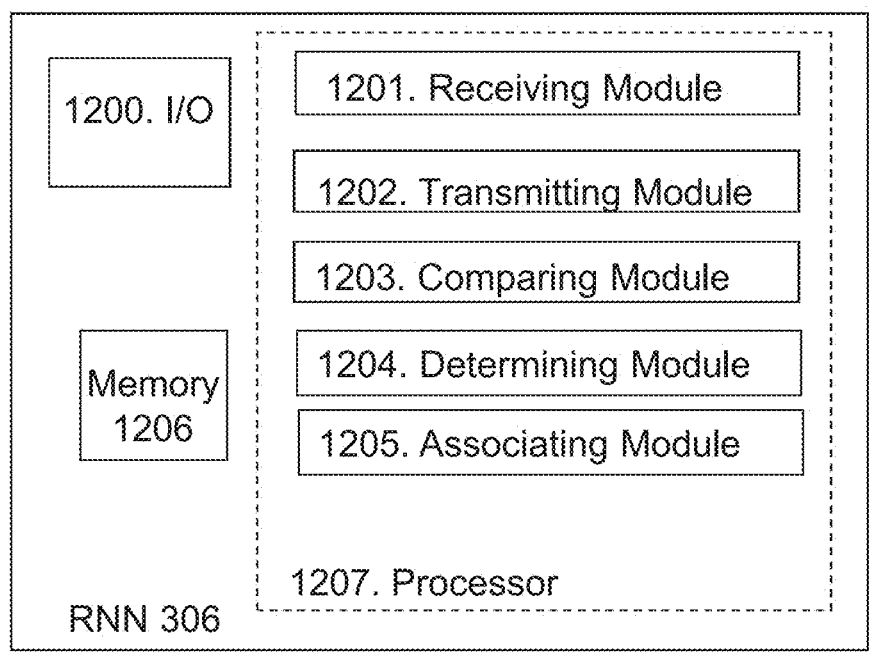
Figure 12b Exemplifying embodiment of the RNN 306

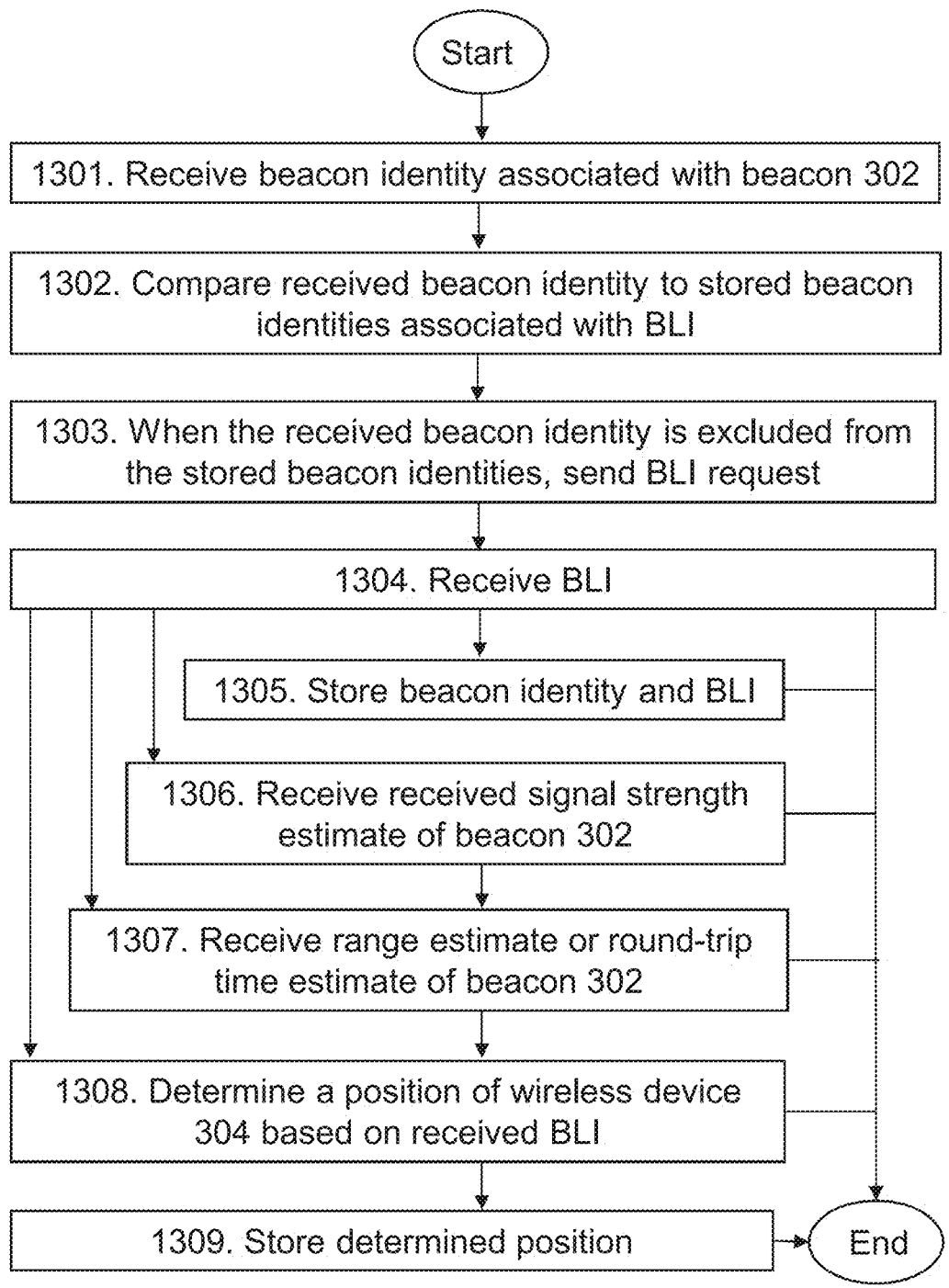
Figure 13 Method performed by Network Node 308,310

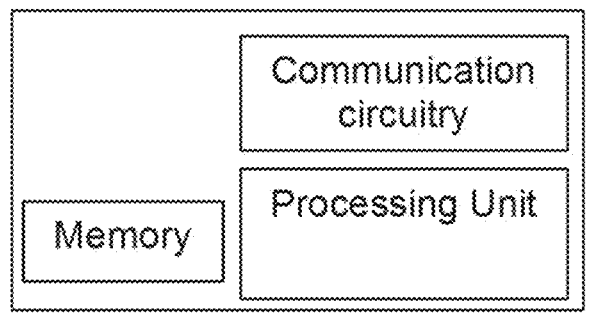
Figure 14a Exemplifying embodiment of the Network Node (NN) 308,310
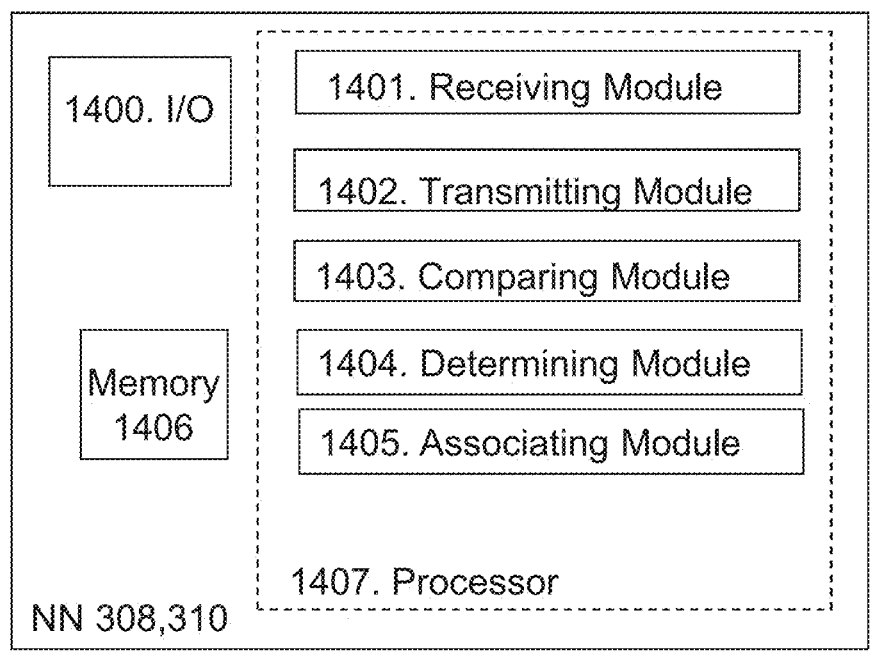
Figure 14b Exemplifying embodiment of the NN 308,310

WIRELESS DEVICE, A RADIO NETWORK NODE, A NETWORK NODE AND METHODS THEREIN

TECHNICAL FIELD

Embodiments herein relate generally to a wireless device, a Radio Network Node (RNN), a network node and to methods therein. In particular, some embodiments relate to providing location information to the RNN or the network node.

BACKGROUND

Communication devices such as terminals are also known as e.g. User Equipments (UE), mobile terminals, stations (STAs), wireless devices, wireless terminals and/or mobile stations. Terminals are enabled to communicate wirelessly in a wireless communications network, such as a cellular communications network sometimes also referred to as a cellular radio system or cellular networks. The communication may be performed e.g. between two terminals, between a terminal and a regular telephone and/or between a terminal and a server via a Radio Access Network (RAN) and possibly one or more core networks, comprised within the cellular communications network.

Terminals may further be referred to as mobile telephones, cellular telephones, laptops, or surf plates with wireless capability, just to mention some further examples. The terminals in the present context may be, for example, portable, pocket-storable, hand-held, computer-comprised, or vehicle-mounted mobile devices, enabled to communicate voice and/or data, via the RAN, with another entity, such as another terminal or a server.

The cellular communications network covers a geographical area which is divided into cell areas, wherein each cell area being served by an access node such as a base station, e.g. a Radio Base Station (RBS), which sometimes may be referred to as e.g. "eNB", "eNodeB", "NodeB", "B node", or BTS (Base Transceiver Station), depending on the technology and terminology used. The base stations may be of different classes such as e.g. macro eNodeB, home eNodeB, micro eNode B or pico base station, based on transmission power, functional capabilities and thereby also cell size. A cell is the geographical area where radio coverage is provided by the base station at a base station site. One base station, situated on the base station site, may serve one or several cells. Further, each base station may support one or several communication technologies. The base stations communicate over the air interface operating on radio frequencies with the terminals within range of the base stations. In the context of this disclosure, the expression Downlink (DL) is used for the transmission path from the base station to the mobile station. The expression Uplink (UL) is used for the transmission path in the opposite direction i.e. from the mobile station to the base station.

In 3rd Generation Partnership Project (3GPP) Long Term Evolution (LTE), base stations, which may be referred to as eNodeBs or even eNBs, may be directly connected to one or more core networks.

3GPP LTE radio access standard has been written in order to support high bitrates and low latency both for uplink and downlink traffic. All data transmission is in LTE controlled by the radio base station.

Finding the accurate position of one or more UEs located in one or more indoor areas for different applications, such as emergency situations, is among one of the studies of 3GPP Release-13. The objective is to study techniques for indoor positioning. The positioning technique and/or positioning system may be Radio Access Technology (RAT) dependent or RAT independent. Some examples of RAT dependent positioning techniques are based on or comprise the use of Observed Time Difference of Arrival (OTDOA), Uplink Time Difference Of Arrival (UTDOA), Enhanced Cell ID (E-CID), Radio Frequency Pattern Matching (RFPM), etc. Some examples of RAT independent positioning techniques are based on or comprise the use of Assisted Global Navigation Satellite System (A-GNSS), Terrestrial Beacon Systems, etc. For indoor UEs, i.e. for one or more UEs located in an indoor environment, their vertical positioning, i.e. the altitude, may also be a useful parameter to be considered, e.g. when the UEs are present in a building with multiple floors.

FIG. 1 illustrates an exemplifying positioning architecture according to prior art. In FIG. 1 a 3GPP LTE and Evolved Packet Core (EPC) communications network 100 is schematically illustrated. An Evolved Serving Mobile Location Center (E-SMLC) 102 supports a UE 104 as well as the network 100 in order to derive an estimate of the position of the UE 104 or of a network node, e.g. an eNB 106. Exemplary use cases comprise emergency use case where emergency calls must be positioned, as well as commercial use cases wherein either the UE 104 or the network 100 benefits from determining the position of the UE 104. The E-SMLC 102 interacts with the UE 104 via an LTE Positioning Protocol (LPP) that may be routed via the control plane or the user plane. Furthermore, the E-SMLC 102 interacts with the eNB 106 via the LPPa protocol. In the latter case, the eNB 106 may interact with the UE 104 via a Radio Resource Control (RRC) message to request information needed for positioning. Examples of such information are radio condition measurements, timing information etc. A typical use of the LPPa protocol is to convey the identity of the serving cell to the E-SMLC 102. The E-SMLC 102 may be seen as an exemplifying Position Determining Entity (PDE), but it may also forward obtained information via the LPP and/or the LPPa protocol to a separate PDE.

In LTE, positioning techniques based on or comprising an enhanced Cell ID, an Assisted Global Navigation Satellite System, an Observed Time Difference of Arrival and/or an Uplink TDOA are considered.

In positioning techniques comprising the enhanced Cell ID, essentially cell ID information is used to associate the UE to the serving area of a serving cell. Further, additional information may be used to determine a finer granularity position.

In positioning techniques comprising the Assisted Global Navigation Satellite System (GNSS), GNSS information is retrieved by the UE and supported by assistance information provided to the UE from the E-SMLC.

In the positioning techniques comprising the Observed Time Difference of Arrival (OTDOA), the UE estimates the time difference of reference signals from different base stations and either sends the estimated time difference to the E-SMLC for multilateration or alternatively the multilateration for position estimation is done by the UE based on assisted information from the E-SMLC.

In the positioning techniques comprising the Uplink TDOA (UTDOA), the UE is requested to transmit a specific waveform that is detected by multiple location measurement units, such as one or more Radio Network Nodes e.g. one or more eNBs, at known positions. These measurements are forwarded to the E-SMLC for multilateration.

Multilateration (MLAT) is a navigation technique based on the measurement of the difference in distance to two stations at known locations that broadcast signals at known times. Unlike measurements of absolute distance or angle, measuring the difference in distance between two stations results in an infinite, e.g. a huge, number of locations that satisfy the first measurement. When these possible locations are plotted, they form a first hyperbolic curve. To locate the exact location along that curve, multilateration relies on multiple measurements: a second measurement taken to a different pair of stations will produce a second hyperbolic curve, which intersects with the first hyperbolic curve. When the two curves are compared, a small number of possible locations are revealed.

Due to the significant amount of path loss in indoor scenarios, e.g. indoor environments, using the existing positioning techniques for accurate indoor positioning estimation may become challenging. Another problem with estimating a position of a UE located inside, e.g. within, an indoor area, is the existence of different floors, e.g. storeys, in the building. Therefore, the vertical accuracy of the position of the UE in the indoor area will also become a challenge, and the performance of the existing positioning techniques for the vertical positioning is still an open area to be studied.

SUMMARY

An object of embodiments herein is to address at least some of the above-mentioned drawbacks among others and to improve the performance in a communications network.

According to a first aspect of embodiments herein, the object is achieved by a method performed by a wireless device for providing location information to a radio network node or a network node. The wireless device, the radio network node and the network node are operating in a wireless communications network.

The wireless device receives, from the radio network node or the network node, a request for Beacon Location Information, BLI. The wireless device obtains BLI from a beacon, wherein the BLI comprises information relating to a location of the beacon, which beacon is located in reach by the wireless device. The wireless device transmits the obtained BLI to the radio network node or the network node.

According to a second aspect of embodiments herein, the object is achieved by a wireless device for providing location information to a radio network node or a network node. The wireless device, the radio network node and the network node are configured to operate in a wireless communications network.

The wireless device is configured to receive, from the radio network node or the network node, a request for Beacon Location Information. The wireless device is configured to obtain BLI from a beacon, wherein the BLI comprises information relating to a location of the beacon, which beacon is located in reach by the wireless device. Further, the wireless device is configured to transmit the obtained BLI to the radio network node or the network node.

According to a third aspect of embodiments herein, the object is achieved by a method performed by a radio network node for providing location information to a network node. The radio network node and the network node are operating in a wireless communications network.

The radio network node receives, from the network node a first Beacon Location Information, BLI, request associated with a wireless device operating in the wireless communications network.

Further, the radio network node sends a second BLI request to the wireless device.

Furthermore, radio network node receives BLI from the wireless device, wherein the BLI comprises information relating to a location of a beacon, which beacon is located in reach by the wireless device. The wireless device sends the received BLI associated with the wireless device to the network node.

According to a fourth aspect of embodiments herein, the object is achieved by a radio network node for providing location information to a network node. The radio network node and the network node are configured to operate in a wireless communications network.

The radio network node is configured to receive, from the network node a first Beacon Location Information, BLI, request associated with a wireless device operating in the wireless communications network.

Further, the radio network node is configured to send a second BLI request to the wireless device.

Furthermore, radio network node is configured to receive BLI from the wireless device, wherein the BLI comprises information relating to a location of a beacon, which beacon is located in reach by the wireless device. The radio network node is configured to send the received BLI associated with the wireless device to the network node.

According to a fifth aspect of embodiments herein, the object is achieved by a method performed by a network node for receiving location information. The network node is operating in a wireless communications network.

The network node receives a beacon identity associated with a beacon, and compares the received beacon identity to stored beacon identities associated with Beacon Location Information, BLI, wherein the BLI comprises information relating to a location of a beacon.

When the received beacon identity is excluded from the stored beacon identities, the network node sends a BLI request and receives BLI in response to the BLI request.

According to a sixth aspect of embodiments herein, the object is achieved by a network node for receiving location information. The network node is configured to operate in a wireless communications network.

The network node is configured to receive a beacon identity associated with a beacon, and to compare the received beacon identity to stored beacon identities associated with Beacon Location Information, BLI, wherein the BLI comprises information relating to a location of a beacon.

When the received beacon identity is excluded from the stored beacon identities, the network node is configured to send a BLI request and receive BLI in response to the BLI request.

According to a seventh aspect of embodiments herein, the object is achieved by a computer program, comprising instructions which, when executed on at least one processor, causes the at least one processor to carry out the method performed by the wireless device.

According to an eighth aspect of embodiments herein, the object is achieved by a computer program, comprising instructions which, when executed on at least one processor, causes the at least one processor to carry out the method performed by the radio network node.

According to a ninth aspect of embodiments herein, the object is achieved by a computer program, comprising instructions which, when executed on at least one processor, causes the at least one processor to carry out the method performed by the network node.

According to a tenth aspect of embodiments herein, the object is achieved by a carrier comprising the computer program, wherein the carrier is one of an electronic signal, an optical signal, a radio signal or a computer readable storage medium.

Since the wireless device receives, from the radio network node or the network node, a request for BLI, obtains BLI from the beacon, wherein the BLI comprises information relating to a location of the beacon, which beacon is located in reach by the wireless device, and since the wireless device transmits the obtained BLI to the radio network node or the network node, accurate location information may be provided for the wireless device when located in an environment experiencing a significant amount of path loss in the radio communication or when located in an environment wherein GPS information is not available. Thereby, an accurate positioning of the wireless device may be accomplished. This results in an improved performance in the communications network.

An advantage with embodiments herein is that accurate location information of the wireless device is provided by means of the beacon which is a small and cheap device that already exist densely in many areas.

Another advantage with embodiments herein is that it is only the wireless device that interacts with the beacon, and thus resources of the radio network node or the network node are not utilized for communication with the beacon. Thereby, the load in the communications network remains unaffected or almost unaffected.

Yet another advantage with some embodiments herein is that they provide for a simplified positioning of the wireless device as compared to conventional positioning methods wherein positioning is based on signals from several radio network nodes.

BRIEF DESCRIPTION OF DRAWINGS

Examples of embodiments herein are described in more detail with reference to attached drawings in which:

FIG. 1 schematically illustrates an exemplifying positioning architecture according to prior art;

FIG. 2 is a flowchart schematically illustrating embodiments of a method in a wireless device;

FIG. 3a schematically illustrates embodiments of a wireless communications network;

FIG. 3b schematically illustrates an exemplifying management architecture according to some embodiments;

FIG. 4 is a schematic combined flow chart and signalling scheme of embodiments of a wireless communications network;

FIG. 5 is a schematic combined flow chart and signalling scheme of embodiments of a wireless communications network;

FIG. 6a is a schematic combined flow chart and signalling scheme of embodiments of a wireless communications network;

FIG. 6b is a schematic combined flow chart and signalling scheme of embodiments of a wireless communications network;

FIG. 6c is a schematic combined flow chart and signalling scheme of embodiments of a wireless communications network;

FIG. 6d is a schematic combined flow chart and signalling scheme of embodiments of a wireless communications network;

FIG. 7 is a schematic combined flow chart and signalling scheme of embodiments of a wireless communications network;

FIG. 8 is a schematic combined flow chart and signalling scheme of embodiments of a wireless communications network;

FIG. 9 is a flowchart schematically illustrating embodiments of a method performed by a wireless device;

FIGS. 10a and 10b are block diagrams schematically illustrating embodiments of a wireless device;

FIG. 11 is a flowchart schematically illustrating embodiments of a method performed by a radio network node;

FIGS. 12a and 12b are block diagrams schematically illustrating embodiments of a radio network node;

FIG. 13 is a flowchart schematically illustrating embodiments of a method performed by a network node; and FIGS. 14a and 14b are block diagrams schematically illustrating embodiments of a network node.

DETAILED DESCRIPTION

As part of developing embodiments herein, some problems with the state of the art communications networks will first be identified and discussed.

As mentioned above, an accurate estimation of an indoor position may become challenging to perform using the existing positioning techniques due to the significant amount of path loss in indoor scenarios, e.g. indoor environments. Another problem with estimating a position of a wireless device, e.g. a UE, located inside, e.g. within, an indoor area of a building, is the existence of different floors, e.g. storeys, in the building. Therefore, the vertical accuracy of the position of the UE in the indoor area will also become a challenge, and the performance of the existing positioning techniques for the vertical positioning is still an open area to be studied.

A problem addressed by embodiments herein is therefore how to provide an accurate position of an indoor located UE, wherein the position is accurate in both a horizontal direction and in a vertical direction. The Terrestrial Beacon Systems may be a candidate solution, however how to interact between the radio network and the beacon system inventory is unknown.

Some embodiments herein relate to a method in a wireless communications device, such as a UE, e.g. an indoor located UE. The method may be summarized to comprise three actions as shown in FIG. 2. However, it should be understood that actions may be optional, may be combined and/or be taken in another suitable order. As schematically illustrated in FIG. 2, some embodiments herein comprises one or more of the following actions:

Action 201: A device, such as a wireless device, e.g. the UE, is configured by a network node, e.g. a first network node, to report location information, e.g. Beacon Location Information (BLI). By the expression "Beacon Location Information" when used in this disclosure is meant information comprising or relating to the location of a beacon, and by means of which information the location of the wireless device may be determined. The beacon is located in vicinity of the wireless device, e.g. the beacon is located in reach by the wireless device. Thus, the beacon is located at distance from the wireless device, at which distance the wireless device is able to hear, e.g. communicate with, the beacon.

Action 202: The device, e.g. the UE, obtains BLI from the beacon.

Action 203: The device, e.g. the UE, signals the BLI to a network node. The network node could be the network node that configured the wireless device to report the BLI, e.g. the first network node, cf. Action 201. However, it should be understood that the network node could be a second network node different from the first network node. Further, the network node could be a radio network node such as a base station, a core network node or a positioning node.

The term 'beacon' when used in this disclosure refers to a transmitting entity, e.g. a transmitting unit, which comprises a Bluetooth transmitter, a WiFi transmitter, or a transmitter using any radio technology at any time and/or frequency resources. The beacon may be a stationary unit or a mobile unit Sometimes herein the beacon will be referred to as a transmitter or a transmitting unit, which transmitter or transmitting unit is configured to transmit its location to a UE or a Network Node, such as a Core Network Node (CNN), a positioning node or a Radio Network Node (RNN). In some embodiments, the RNN is a base station.

By embodiments herein one or more of the following advantages may be provided.

Firstly, the beacons are small, cheap devices which already exist densely in many areas and may provide location information while Global Positioning System (GPS) information is not available. The beacons may be configured by other systems than the positioning database. It may therefore be more convenient to handle the beacon positions via broadcast instead of interactions between different inventory systems.

Secondly, it is only the UE that interfaces different beacons, and there is no interaction between the network node and the beacon system inventory.

Thirdly, the automated retrieval of beacon location information may facilitate handling of the beacons, in particular when the beacons are managed by a different inventory system, and/or when multiple positioning determining entities are in use. It may also enable the use of mobile beacons where the beacon location information varies over time. It also enables the use of distributed beacon location information databases in the network nodes such as the base stations without implying a significant configuration challenge.

Fourthly, both the RRC protocol and the LPP protocol may be alternative reporting protocols as both a base station and a network node, such as the E-SMLC, may request beacon location information.

Fifthly, in case the base station is the network node requesting the beacon location information, it is possible to directly send the location information to units such as a management node or some other network node via the base station.

TERMINOLOGIES

The following commonly terminologies are used in embodiments and are elaborated below:

Radio network node: In some embodiments the non-limiting term radio network node is more commonly used and it refers to any type of network node serving UE and/or connected to other network node or network element or any radio node from where UE receives signal. Examples of radio network nodes are Node B, Base Station (BS), Multi-Standard Radio (MSR) radio node such as MSR BS, eNode B, network controller, Radio Network Controller (RNC), base station controller, relay, donor node controlling relay, Base Transceiver Station (BTS), Access Point (AP), transmission points, transmission nodes, Radio Remote Unit (RRU), Remote Radio Head (RRH), nodes in Distributed Antenna System (DAS) etc.

Network node: In some embodiments a more general term "network node" is used and it may correspond to any type of radio network node or any network node, which communicates with at least a radio network node. Examples of network node are any radio network node stated above, core network node (e.g. Mobile Switching Center (MSC), Mobility Management Entity (MME) etc), Operations and Maintenance (O&M), Operations Support System (OSS), Self-Organizing Network (SON), positioning node (e.g. Enhanced Serving Mobile Location Center (E-SMLC)), Mobile Data Terminal (MDT) etc.

User equipment: In some embodiments the non-limiting term user equipment (UE) is used and it refers to any type of wireless device communicating with a network node in a communication system. Examples of UE are target device, device to device UE, machine type UE or UE capable of machine to machine communication, Personal Digital Assistant (PDA), iPAD, Tablet, mobile terminals, smart phone, Laptop Embedded Equipped (LEE), Laptop Mounted Equipment (LME), USB dongles etc. In this disclosure the terms communications device, wireless device and UE are used interchangeably. Further, it should be noted that the term user equipment used in this disclosure also covers other communications devices such as Machine Type of Communication (MTC) device, an Internet of Things (IoT) device, e.g. a Cellular IoT (CIoT) device. Please note the term user equipment used in this document also covers other wireless devices such as Machine to Machine (M2M) devices, even though they do not have any user.

Note that although terminology from 3GPP LTE has been used in this disclosure to exemplify the embodiments herein, this should not be seen as limiting the scope of the embodiments herein to only the aforementioned system. Other wireless systems, including WCDMA, WiMax, UMB and GSM, may also benefit from exploiting the ideas covered within this disclosure.

In this section, the embodiments herein will be illustrated in more detail by a number of exemplary embodiments. It should be noted that these embodiments are not mutually exclusive. Components from one embodiment may be tacitly assumed to be present in another embodiment and it will be obvious to a person skilled in the art how those components may be used in the other exemplary embodiments.

Embodiments herein relate to a wireless communications network 300 as schematically illustrated in FIG. 3a. The wireless communications network may be a cellular communications network. Further, the communications network 300 may be an LTE network, a WCDMA network, an GSM network, any 3GPP cellular network, Wimax, or any other wireless communications network or system.

The wireless communications network 300 comprises one or more beacons 302. The one or more beacons 302 are operating in the communications network 300. Further, the beacons 302 may be outdoor beacons 302a or indoor beacons 302b. The one or more beacons are characterized by that they transmit an identifier as well as location information associated to the location of the beacon. A beacon 300 may be indoors or outdoors, may be utilizing the same radio access technology as is used for communication by a UE or different. A beacon may be serving multiple purposes comprising providing positioning support, or tailored only for positioning support. In the latter case, these beacons may be made relatively cheap, and energy efficient.

A wireless device, e.g. a user equipment (UE), 304 is also comprised in and operating in the wireless communications network 300, i.e. the wireless device 304 is configured to operate in the wireless communications network 300. According to embodiments, the wireless device 304 is located indoors, i.e. within a building or the like.

The wireless communications network 300 comprises further one or more Radio Network Nodes 306 configured to operate in the wireless communications network 300. The radio network node 306 may be a transmission point such as a radio base station, for example an eNodeB, also denoted eNB, a Home eNodeB, or a NodeB or any other network node capable to serve a wireless device, e.g. a user equipment or a machine type communication device in a wireless communications network, such as the communications network 300.

One or more Network Nodes 308,310 are also comprised in and configured to operate in the wireless communications network 300. The network node may be a core network node such as a Mobility Management Entity (MME) 308 or a positioning node such as an Evolved Serving Mobile Location Center (E-SMLC) 310. However, as mentioned above, the term "network node" may refer to any type of radio network node or network node. Thus, sometimes in this disclosure the term "network node" is used to refer not only to the MME 308 and the E-SMLC 310, but also to the RNN 306.

Embodiments herein comprise one or more other modules configured to realise features and to perform actions described herein.

FIG. 3b schematically illustrates an example of a management architecture, wherein a Domain Manager (DM) configures and monitors one or more Network Elements (NE) such as one or more base stations. The DM may be an Operations Support System (OSS). Further, there may be several domain managers supporting the wireless network, all managed by a Network Manager (NM) interfacing an operator. As illustrated, the NE, e.g. the eNodeB, communicates with the DM, e.g. the OSS, using an Itf-S protocol. The DM administrates a domain such as a radio access network or a beacon network. In some embodiments, the DM handles the beacons and their locations, for example via planning, or as obtained during an installation procedure. In some embodiments, the DM handles the RNNs, e.g. the base stations, and statistics associated to RNNs' operations. Such statistics may be information about identified beacons, the fraction of wireless devices that have reported a capability to interact with beacons to retrieve BLI. Such statistics may be presented to the operator of the network.

Beacon Location Information (BLI)

The BLI comprises location information of the beacon 302. The location information may be or comprise one or more of:

Positioning information in two or three dimensions such as longitude, latitude and height (also referred to as coordinates) with respect to a geodetic datum (also referred to as a coordinate system), where the latter is either comprised in the location information or preconfigured. One example of a pre-configured datum is World Geodetic System (WGS) 84, which is commonly used for sea level coordinates as a horizontal datum. In addition, a vertical datum describes the height. One example of height is the elevation above the ellipsoid described by the WGS84 datum. For more details about the Universal Geographical Area Description (GAD), this is described in more detail in [3GPP TS 23.032 V.6.0.0]

Coordinates with respect to a local coordinate system in a grid projection, typically a Cartesian coordinate system. Such coordinate systems are only valid in a local area. The typical representation feature X and Y coordinates for the horizontal plane and Z for elevation.

Building centric coordinate systems. Such systems comprise a building identifier and a height over a reference level. The reference level may be the ground level, the ground floor level etc. The height may be defined with respect to a distance measure such as a meter, or quantized in floors. The horizontal position may be defined relative a reference position such as the building center or a corner of the building.

Generalized elevation information comprising a pressure estimate, a temperature estimate, etc. Such information enables a network node to determine an elevation estimate with respect to a reference elevation.

Velocity information. Mobile beacons may also provide velocity information relative a coordinate system. It may be divided up in components along coordinate axis such as a velocity component in each of the x, y and z dimensions. It may also be given as a velocity magnitude and direction information, where the direction angle may be given relative reference planes or directions, such as an angle relative geographical north and an angle relative the horizontal plane.

Signaling Support for Some Embodiments

As previously mentioned, embodiments herein may comprise the following actions that are schematically illustrated in FIG. 2. Further, embodiments herein may be described with reference to the signalling scheme schematically illustrated in FIG. 4.

Action 201: A device, e.g. the wireless device 304, is configured by a network node, e.g. the RNN 306, the CNN 308 or the positioning node 310, to report location information, e.g. Beacon Location Information (BLI). This Action relates to Action 401 in FIG. 4, wherein the RNN 306 or the network node 308,310 may transmit a request for BLI to the wireless device 304.

Action 202: The device, e.g. the wireless device 304, obtains BLI from the beacon 302, e.g. the outdoor beacon 302a or the indoor beacon 302b. This Action relates to Action 402 in FIG. 4, wherein the beacon 302 transmits BLI to the wireless device 304.

Action 203: The device, e.g. the wireless device 304, signals the BLI to the network node, e.g. to the RNN 306 or to the network node 308,310. This Action relates to Action 403 in FIG. 4, wherein the wireless device 304 transmits the BLI to the RNN 306 or the network node. 308,310.

In one embodiment, the network node 308,310 in Action 201 mentioned above is a network node 308,310, such as an E-SMLC 310. The E-SMLC 310 may use a positioning protocol, such as an LPP, to configure the device, e.g. the wireless device 304, to report BLI in Action 201 mentioned above, and the wireless device 304 may respond in Action 203 with the retrieved BLI via the positioning protocol, e.g. the LPP, as well. The positioning protocol between the network node 308,310 and the wireless device 304 may be routed via the control plane via the eNB 306, or via the user plane.

In another embodiment, the positioning protocol is split in one part between the UE 304 and the RNN 306, e.g. eNB, and one part between the RNN 306, e.g. eNB, and the network node 308,310, in which case the RNN 306 act as a proxy. One example of such split positioning protocols are an RRC protocol between the RNN 306 and the wireless device 304, and an LPPa protocol between the RNN 306 and the E-SMLC 310, cf. FIG. 3*a*. Other examples between the RNN 306 and a network node 308,310 comprises a management interface protocol, such as an Itf-S protocol between a RNN, such as an eNodeB, and a network node, such as an OSS, cf. FIG. 3*b*.

In another embodiment, the network node 308,310 in Action 201 mentioned above is the RNN 306, e.g. the radio base station serving the wireless device 304. The base station may use the RRC protocol to configure the wireless device 304 to report BLI in Action 201, and the wireless device 304 may respond in Action 203 with the retrieved BLI via the RRC protocol as well. This embodiment may be seen as a component in the previous embodiment wherein the RNN 306, e.g. the base station, acts as a proxy.

According to some embodiments, the request (e.g. Action 201) from the network node 306,308,310 to the wireless device 304 to retrieve BLI is a measurement configuration with a purpose indicating that the wireless device 304 shall report the location information of the beacon 302.

In some embodiments, the wireless device 304 starts a timer when receiving the measurement reconfiguration comprising an indicated purpose that the wireless device 304 shall report the location information of the beacon 302. The timer initialization may depend on the beacon type, and may be different if the beacon 302 is using E-UTRAN, UTRAN, GERAN, WiFi, Bluetooth, ZigBee, etc. In addition, the wireless device 304 may be required to report location information if the purpose is indicated as 'reportStrongestCells' or 'reportStrongestCellsForSON', which indicate that the wireless device 304 shall report the strongest cells e.g. beacons at a specific frequency carrier.

In some embodiments, the wireless device 304 may obtain a measurement gap configuration to enable the wireless device 304 to retrieve the location information of the beacon 302. Alternatively, the wireless device 304 may be allowed to use autonomous gaps, and neglect downlink data in order to be able to retrieve the location information of the beacon 302.

In Action 202 mentioned above, the beacon 302 may regularly or irregularly transmit its identity to enable discovery and detection by the wireless device 304. Alternatively, it may transmit a lower layer identifier or a reference signal, e.g. a physical cell/beacon identifier, and upon request from the wireless device 304 respond with its identifier. Moreover, the beacon 302 may transmit a lower layer identifier regularly, and may transmit a unique identifier, e.g. a Cell Global Identifier (CGI), a Basic Service Set Identifier (BSSID) such as a MAC address, UUID, etc. In Bluetooth Smart, services, and the Bluetooth SIG have reserved a range of UUIDs (Universally Unique IDentifiers) (of the form xxxxxxxx-0000-1000-8000-00805F9B34FB) for standard attributes. In the IEEE 802.11 specification for wireless local area networks, the beacon frame comprises a source address, e.g. a MAC address, and a destination address (for broadcast, the standard broadcast address for broadcast support which is all ones may be considered). Similarly, the beacon 302 may regularly or irregularly transmit its BLI. Alternatively, it may only provide its BLI upon request from the UE 304, as illustrated by FIG. 5. As schematically illustrated in FIG. 5, in Action 501, the network node 306,308,310 may ask the wireless device 304, e.g. the UE, for the beacon's 302 BLI. In Action 502, the wireless device 304 may transmit a BLI Request to the beacon 302, which in Action 503 may respond to the wireless device 304 by transmitting a BLI response. In Action 504 and when in receipt of the beacon's 302 BLI, the wireless device 304 may forward the BLI to the network node 306,308,310 asking for it. In this context, the expressions "regular transmit" means broadcasting of identity or/and BLI, and "irregular transmit" corresponds to handshake procedure (request-response).

In Action 203 mentioned above, the wireless device 304 may respond via an RRC message to the network node 306,308,310. One example is to respond via a measurement report message, for example in a measurement result information element. The location information may be signaled in a similar manner as the wireless device 304 signals its own location information in E-UTRAN. An exemplary LocationInfo Information element is given below.

| LocationInfo information element |
| --- |
| -- ASN1START |
| LocationInfo-r10 ::=SEQUENCE { |
|   locationCoordinates-r10      CHOICE { |
|     ellipsoid-Point-r10                       OCTET STRING, |
|     ellipsoidPointWithAltitude-r10        OCTET STRING, |
|     ..., |
|     ellipsoidPointWithUncertaintyCircle-r11    OCTET STRING, |
|     ellipsoidPointWithUncertaintyEllipse-r11   OCTET STRING, |
|     ellipsoidPointWithAltitudeAndUncertaintyEllipsoid-r11   OCTET STRING, |
|     ellipsoidArc-r11                            OCTET STRING, |
|     polygon-r11                                 OCTET STRING |
|   }, |
|   horizontalVelocity-r10    OCTET STRING        OPTIONAL, |
|   gnss-TOD-msec-r10        OCTET STRING        OPTIONAL, |
|   ... |
| } |
| -- ASN1STOP |

If the timer has expired before the BLI has successfully been retrieved, then the wireless device 304 may respond with a report without the BLI.

Beacon Location Information Retrieval Upon Request

In some situations, the network node 306,308,310 may or may not have an association between a beacon identifier and a BLI. Therefore, when the wireless device 304 reports a beacon identifier to the network node 306,308,310, it may or may not need to establish the association between a beacon identifier and the BLI. Therefore, some embodiments comprise a separate beacon identity ID reporting, and optional location information request, retrieval and/or report steps.

FIG. 6*a* schematically illustrates an embodiment wherein the wireless device 304 reports, e.g. transmits, the identity ID of the beacon 302 to the network node 306,308,310. As schematically illustrated in FIG. 6*a*, the beacon 302 may report its identity ID to the wireless device 304 in Action 601*a*, and in Action 602*a*, the wireless device 304 may report the beacon identity ID to the network node 306,308,310. The reporting of the beacon ID, e.g. the reporting of the beacon ID from the wireless device 304 to the network node 306,308,310, may be configured on demand, periodically or it may be event driven. An example of an event triggering the reporting of the beacon ID is that the received signal strength of the beacon 302 exceeds a threshold value.

In case the network node 306,308,310 does not have an association between the reported beacon identifier to a stored BLI, it will request the wireless device 304 to retrieve and report the BLI. This may be accomplished by transmitting a BLI request to the wireless device 304.

After reporting the identity ID, the network node 306, 308,310 may in Action 603*a* ask the wireless device 304 about a BLI of the beacon 302. This may be accomplished by transmitting a request for BLI to the wireless device 304. The wireless device 304 may in Action 604*a* receive the BLI from the beacon 302, and in Action 605a it may transmit the BLI of the beacon 302 to the network node 306,308,310. It should be understood that the order of the actions given above is only given as an example and that the actions may be performed in another suitable order and that actions may be combined. Further one or more of the actions are optional.

In some embodiments, the wireless device 304 may obtain information about the beacon ID from the network node 306,308,310 to clarify for which beacon 302 the wireless device 304 shall retrieve the BLI from. The beacon ID may be obtained via a "cellForWhichToReportLocationInfo" information element or similar. The beacon ID may be a local identifier such as a reference signal identifier, a physical cell identifier, or a part of a Universally Unique ID (UUID) such as an Enhanced Cell Global Identifier (E-CGI), a Bluetooth UUID, a MAC address etc.

In some embodiments, the wireless device 304 retrieves beacon mobility information in conjunction with the retrieval of the beacon identity. Thus, the wireless device 304 may obtain beacon mobility information when obtaining the beacon identity. The beacon mobility information may be an indicator of whether or not the beacon 302 is mobile. The indicator may be separate from or integrated with the beacon identity. For example, a first range of beacon identifiers may be reserved for mobile beacons and a second range of beacon identifiers may be reserved for stationary beacons.

In some embodiments, the network node 306,308,310 comprises a database and/or a memory (not shown) configured to store the beacon's location information. This will decrease the uncertainty factor of the stationary beacon's location information reported by the UEs. The database may be updated over time, and may omit the need of sending the known BLI by the wireless device 304. The database may be distributed to a base station 306 to enable the base station to determine whether there exists an association between a beacon identifier and its BLI.

In a base station proxy embodiment schematically illustrated in FIG. 6b, the wireless device 304 is pre-configured or optionally configured by a RNN 306 or a network node 308,310 to trigger a report when detecting a beacon 302 and to include in the report the beacon identity, cf. Action 601b. When the wireless device 304 detects the beacon 302 and retrieves its ID, cf. Action 602b, it reports the ID to the serving RNN 306 in Action 603b. The RNN 306 checks its stored beacon ID-BLI associations, cf. Action 604b and if the received ID is not available among the stored associations, it requests the wireless device 304 in Action 605b to retrieve the BLI for the beacon 302 having the ID. This may be accomplished by transmitting a BLI request, e.g. a first BLI request, to the wireless device 304. Optionally, the wireless device 304 needs to send a BLI request, e.g. a second BLI request, to the beacon 302, cf. Action 606b. The wireless device 304 retrieves the BLI from the beacon 302 in Action 607b, and reports the BLI to the RNN 306 in Action 608b. The RNN 306 updates its associations with the ID-BLI tuple, e.g. the ID-BLI pair, retrieved by the wireless device 304 in Action 609b, and sends the BLI, and optionally also the ID, to the network node 308,310 in Action 610b.

FIG. 6c schematically illustrates some embodiments, wherein the BLI-ID association is maintained in the network node 308,310 based on information from and requests to the wireless device 304 via the RNN 306.

As schematically illustrated in FIG. 6c, the wireless device 304 is in Action 601c pre-configured or optionally configured by the RNN 306 or the network node 308,310 to trigger a report when detecting a beacon 302 and to include in the report the beacon identity ID. In Action 602c, the beacon 302 transmits its ID to the wireless device 304, and in Action 603c the wireless device 304 reports the ID to the serving RNN 306. In Action 604c the RNN 306 reports the received ID to the network node 308,310. The network node 308,310 checks its stored beacon ID-BLI associations in Action 605c and if the received ID is not available in its stored beacon ID-BLI associations, it requests the RNN 306 to retrieve the BLI in Action 606c. In Action 607c, the RNN 306 asks, e.g. by transmitting a BLI request, the wireless device 304 about the BLI. Optionally, the wireless device 304 needs to send a BLI request to the beacon 302, cf. Action 608c. In some embodiments, the BLI request transmitted from the RNN 306 to the wireless device 304 is referred to a first BLI request and the BLI request transmitted from the wireless device 304 to the beacon 302 is referred to a second BLI request. It should be understood that the first and second BLI requests or parts thereof may be identical. The wireless device 304 receives the BLI from the beacon 302 in Action 609c, and transmits the BLI to the RNN 306 in Action 610c. In Action 611c, the RNN 306 reports the BLI to the network node 308,310. The network node 308,310 makes an ID BLI association in Action 612c.

It should be understood that the order of the actions given above is only given as an example and that the actions may be performed in another suitable order and that actions may be combined. Further one or more of the actions are optional.

FIG. 6d describes some embodiments, wherein associations between ID and BLI are made in both the RNN 306 and the network node 308,310. This enables the RNN 306 to check if there exists an ID-BLI association upon receiving an ID. If there exists an association, the RNN 306 sends the BLI and optionally the ID to the network node 308,310. However, if the RNN 306 does not have an association between ID and BLI, then it forwards only the ID. The remaining actions are a combination of actions from FIGS. 6b and 6c.

As schematically illustrated in FIG. 6d, the wireless device 304 is in Action 601d pre-configured or optionally configured by the RNN 306 or the network node 308,310 to trigger a report when detecting a beacon 302 and to include in the report the beacon identity ID. In Action 602d, the beacon 302 transmits its ID to the wireless device 304, and in Action 603d the wireless device 304 reports the ID to the serving RNN 306. In Action 604d, the RNN 306 checks its stored beacon ID-BLI associations for a valid ID-BLI association. In Action 605d, the RNN 306 sends the BLI and optionally the ID to the network node 308,310 when it has a valid ID-BLI association, and sends only the ID to the network node 308,310 when it does not have a valid ID-BLI association. In Action 606d, the network node 308,310 checks its stored beacon ID-BLI associations and if the ID is not available among the stored associations, it requests the RNN 306 to retrieve the BLI in Action 607d. In Action 608d, the RNN 306 asks the wireless device 304 for the BLI. This may be performed by transmitting a BLI request, e.g. a first BLI request, to the wireless device 304. Optionally, the wireless device 304 needs to send a BLI request, e.g. a second BLi request, to the beacon 302, cf. Action 609d. In Action 610d, the beacon 302 sends the BLI to the wireless device 304, and the wireless device 304 reports the BLI to the RNN 306 in Action 611d. In Action 612d, the RNN makes an ID BLI association, and in Action 613d, the RNN 306 reports the BLI to the network node 308,310. The network node 308,310 makes an ID BLI association in Action 614d.

It should be understood that the order of the actions given above is only given as an example and that the actions may be performed in another suitable order and that actions may be combined. Further one or more of the actions are optional.

When the network node 306,308,310 obtains a reported beacon identifier, e.g. a beacon ID, that indicates a mobile beacon 302, then the network node 306,308,310 requests the wireless device 304 to retrieve the BLI, even though it may have an association to BLI from a previous time, e.g. from a previous point in time. The reason for this is that the mobile beacon 302 may have moved to another location different from the BLI reported at the previous point in time.

Beacon Location Information and RSS Information

According to some embodiments, the wireless device 304 also reports the Received Signal Strength (RSS) of the beacon 302 to the network node 306,308,310 as it is schematically shown in FIG. 7. This may be either in a separate back and forth signaling from the network node 306,308,310 to wireless device 304 or in the same signaling message together with the BLI.

As schematically illustrated in FIG. 7, the beacon 302 reports its ID to the wireless device 304 in Action 701. In Action 702, the wireless device reports the beacon ID to the network node 306,308,310. As illustrated, the network node 306,308,310 may in Action 703 ask the wireless device 304 about BLI for the beacon 302 having the reported ID, e.g. by transmitting a BLI request such as a first BLi request. In some embodiments, when the wireless device 304 does not have information about the BLI for the beacon 302, the wireless device 304 sends in Action 704 a BLI request, e.g. a second BLI request, to the beacon 302. In Action 705, the beacon 302 sends a BLI response to the wireless device 304, which BLI response comprises the BLI. The wireless device 304 forwards the BLI to the network node 306,308,310 in Action 706. In Action 707, the network node 306,308,310 ask the wireless device 304 about RSS information, e.g. by transmitting an RSS request. In Action 708, the wireless device 304 transmits RSS information to the network node 306,308,310. As previously mentioned, the RSS Information may be comprised in the BLI signalling. Thus, the request for RSS information may be comprised in the request for BLI in Action 704 above, and the response with RSS information may be comprised in the BLI response mentioned in Action 705 above.

In some embodiments, the network node 306,308,310 uses the received RSS information to estimate the distance between the wireless device 304 and the beacon 302.

It should be understood that the order of the actions given above is only given as an example and that the actions may be performed in another suitable order and that actions may be combined. Further one or more of the actions are optional.

The wireless device 304 may detect several surrounding beacons 302 and send the signal strength, e.g. the RSS, of those beacons 302 and their location through different signaling to the network node 306,308,310, e.g. to the RNN 306 via the RRC protocol. The network node 306,308,310 receives the data and determines, e.g. calculates, the position of the wireless device 304. The location of the beacon 302 may be stored in the network node 306,308,310, for reducing the number of signaling in the future for that specific known beacon 302. The position of the wireless device 304 may also be sent and used in Operations, Administrations and Management (OAM) and Service Enabled Platforms (SEP).

According to some embodiments, the wireless device 304 also reports a UE to beacon range estimate Range Est Info as it is schematically shown in FIG. 8. The range estimate may for example be calculated by using a round trip time estimate or using a time of arrival estimate. This may be either in a separate back and forth signaling from the network node 306,308,310 to wireless device 304 or in the same signaling message together with the BLI.

As schematically illustrated in FIG. 8, the beacon 302 reports its ID to the wireless device 304 in Action 801. In Action 802, the wireless device 304 reports the ID to the network node 306,308,310. As illustrated, the network node 306,308,401 may in Action 803 ask the wireless device 304 about the BLI for the beacon 302 having the reported ID. This may be performed by transmitting a BLI request, e.g. a first BLI request, to the wireless device 304. In some embodiments, when the wireless device 304 does not have information about the BLI for the beacon 302, the wireless device 304 sends in Action 804 a BLI request, e.g. a second BLI request, to the beacon 302. In Action 805, the beacon 302 sends a BLI response to the wireless device 304, which BLI response comprises the BLI. The wireless device 304 forwards the BLI to the network node 306,308,310 in Action 806. In Action 807, the network node 306,308,310 ask the wireless device 304 about an beacon Range Estimate Information (Range Est Info) and in Action 808, the wireless device 304 transmits the beacon range estimate information to the network node 306,308,310. As previously mentioned, the beacon range estimate information may be comprised in the BLI signalling. Thus, the request for the beacon range estimate information may be comprised in the request for BLI in Action 804 above, and the response with the beacon range estimate information may be comprised in the BLI response mentioned in Action 805 above.

In some embodiments, the network node 306,308,310 uses the received range estimate information Range Est information to estimate the distance between the wireless device and the beacon.

It should be understood that the order of the actions given above is only given as an example and that the actions may be performed in another suitable order and that actions may be combined. Further one or more of the actions are optional.

Furthermore, the beacon ID may give the network node 306,308,310 information of what features the beacon 302 supports and based on this information, the network node 306,308,310 chooses a set of features and requests the wireless device 304 to send the corresponding information. The examples above with RSS and range estimate are two examples of such beacon and/or UE features.

Examples of methods performed by the wireless device 304 for providing location information to the radio network node 306 or the network node 308,310 will now be described with reference to flowchart depicted in FIG. 9. The wireless device 304, the radio network node 306 and the network node 308,310 are operating in the wireless communications network 300.

The methods comprise one or more of the following actions. It should be understood that these actions may be taken in any suitable order and that some actions may be combined.

Action 901

The wireless device 304 may obtain a beacon identity from the beacon 302. As previously mentioned, the beacon may transmit, e.g. broadcast, a signal comprising information about or relating to identity and/or location of the beacon. When the wireless device 304 is in vicinity of the beacon 302 it may receive the signal.

Action 902

The wireless device 304 may transmit the beacon identity to the radio network node 306 or the network node 308,310. The wireless device may do this in order to inform the RNN 306 or the network node 308,310 about the identity of the beacon 302 which beacon is in vicinity of the wireless device 304.

Action 903

The wireless device 304 receives from the radio network node 306 or the network node 308,310 a request for Beacon Location Information (BLI). The wireless device 304 may be configured with a the request for BLI. For example, the RNN 306 or the network node 308,310 may configure the wireless device 304 to provide BLI. Thus during configuration, the wireless device 304 receives the request for BLI from the RNN 306 or the network node 308,310.

In some embodiments, the request for BLI comprises the beacon identity. The beacon identity identifies the beacon for which BLI is to be obtained.

Action 904

The wireless device 304 obtains the BLI from the beacon 302. The BLI comprises information relating to a location of the beacon 302, which beacon 302 is located in reach by the wireless device 304. The wireless device 304 may for example receive BLI from the beacon 302. In some embodiments, the wireless device 304 receives the BLI in response to a transmitted a request for beacon location information. Thus, the wireless device 304 may obtain the BLI from the beacon 302 by sending a BLI request to the beacon 302. This corresponds to Actions 502, 606b, 608c, 609d, 704, 804 described above.

Alternatively, the wireless device 304 obtains the BLI by retrieving it from the beacon 302.

In some embodiments, the wireless device 304 obtains the BLI after it has transmitted the beacon identity to the radio network node 306 or the network node 308,310. Thus, in such embodiments, the wireless device 304 will transmit the beacon identity at a first point in time and the beacon location information at a second point in time. However, it should be understood that the beacon identity and the beacon location information may be transmitted at the same point in time.

In some embodiments, the wireless device 304 obtains the BLI from the beacon 302 by obtaining a mobility indicator from the beacon 302, and by determining to retrieve the BLI based on the obtained mobility indicator. For example, the mobility indicator may indicate the beacon 302 as a mobile beacon or a stationary beacon. Thus, the obtained mobility indicator from the beacon may be used to determine the proper beacon location for example in case of a mobile beacon.

Action 905

The wireless device 304 transmits the BLI to the RNN 306 or the network node 308,310. Thereby, the RNN 306 or the network node 308,310 will receive knowledge about the location of the beacon 302, by means of which the position of the wireless device 304 may be determined.

Action 906

The wireless device 304 may transmit, to the RNN 306 or the network node 308,310, a received signal strength estimate of the beacon 302.

This is done to enable the RNN 306 or the network node 308,310 to estimate the distance between the wireless device and the beacon based on the received signal strength estimate.

Action 907

The wireless device 304 may transmit, to the RNN 306 or the network node 308,310, a range estimate or a round-trip time estimate of the beacon 302.

This is done to enable the RNN 306 or the network node 308,310 to estimate the distance between the wireless device and the beacon based on the range estimate or the round-trip time estimate.

To perform the method for providing location information to the RNN 306 or the network node 308,310, the wireless device 304 may be configured according to an arrangement depicted in FIGS. 10a and 10b. The wireless device 304, the radio network node 306 and the network node 308,310 are operating in the wireless communications network 300.

Some embodiments herein relates the wireless device 304 as schematically illustrated in FIGS. 10a and 10b. As schematically illustrated in FIG. 10a, the wireless device 304 may be configured with a first and second radio circuitries, which also may be one and the same radio circuitry. The first radio circuitry may be configured to retrieve signals and messages from the beacon 302 and optionally send messages to the beacon 302, and the second radio circuitry may be configured to communicate with the RNN 306 and one or more network nodes 308,310 via the RNN 306. The wireless device 304 may also comprise a memory to store information related to embodiments described herein, and a processing unit, sometimes also referred to as a processing module or a processor.

The first radio circuitry may further be configured to monitor beacon signals and estimate the received signal strength. Information about detected signals and messages are forwarded to the processing unit. The processing unit may be configured to decode the detected signals from the first radio circuitry, and recover the beacon identity and/or the beacon location information. The processing unit may also be configured to upon reception of a beacon location information request message via the second radio circuitry, configure the first radio circuitry to retrieve the beacon location information, and forward the beacon location information to the RNN via the second radio circuitry.

The processing unit may also be configured to request received signal strength estimates from the first radio circuitry to be reported to the RNN via the second radio circuitry.

The processing unit may also be configured to request the first radio circuitry to exchange messages with the beacon to estimate the round-trip time and/or range to the beacon from the wireless device 304.

The first radio unit may also be configured to retrieve a mobility indicator from the beacon 302, and send the mobility indicator to the processing unit.

Upon receiving a mobility indicator, and the mobility indicator indicates that the beacon is potentially mobile, the processing unit may be configured to request the first radio circuitry to retrieve the beacon location information, and send via the second radio circuitry a message to the RNN comprising the beacon location information.

According to some embodiments, cf. e.g. FIG. 10b, the wireless device 304 comprises means configured to perform one or more of the actions mentioned above as being performed by the processing unit. For example, the wireless device 304 may comprise an input/output interface 1000, a receiving module 1001 and a transmitting module 1002 configured to realise the communication described above or parts thereof. In some embodiments, the wireless device 304 comprises one or more modules or units, such as a decoding module 1003, a configuring module 1004, an estimating module 1005, a requesting module 1006 etc., configured to perform one or more of the actions mentioned above as being performed by the processing unit 1008. These modules will be described in more detail below.

The wireless device 304 is configured to receive, by means of the receiving module 1001 configured to receive, a request for BLI from one or more network nodes, e.g. the RNN 306 or the network node 308,310. The receiving module 1001 may be implemented by or arranged in communication with the processor 1008 of the wireless device 304. The processor 1008 will be described in more detail below.

The request for BLI may comprise a beacon identity.

The wireless device 304 is further configured to obtain the BLI from the beacon 302. In some embodiments, the wireless device 304 is configured to receive the beacon location information from the beacon 302. The BLI comprises information relating to a location of the beacon 302, which beacon 302 is located in reach by the wireless device 304. Further, the wireless device 304 may be configured to obtain the BLI from the beacon 302 by being configured to send to the beacon 302 a BLI request, and by receiving the BLI in response to the transmitted request.

In some embodiments, the wireless device 304 is configured to obtain the BLI from the beacon 302 by being configured to obtain a mobility indicator from the beacon 302, and determine to retrieve the beacon location information based on the obtained mobility indicator.

The wireless device 304 may be configured to obtain, e.g. receive, the beacon identity from the beacon 302.

The wireless device 304 is configured to transmit, by means of the transmitting module 1002 configured to transmit, BLI to one or one or more network nodes, e.g. the RNN 306 or the network node 308,310. The transmitting module 1002 may be implemented by or arranged in communication with the processor 1008 of the wireless device 304.

In some embodiments, the wireless device 304 is configured to transmit the beacon identity to the RNN 306 or the network node 308,310.

The wireless device 304 may be configured to transmit the beacon identity to the RNN 306 or the network node 308,310 before obtaining the BLI.

In some embodiments, the wireless device 304 is configured to transmit, to the RNN 306 or the network node 308,310, a received signal strength estimate of the beacon 302.

The wireless device 304 may be configured to transmit, to the radio network node 306 or the network node 308,310, a range estimate or a round-trip time estimate of the beacon 302.

The wireless device 304 may also comprise means for storing data such as one or more beacon identities and BLI. In some embodiments, the wireless device 304 comprises a memory 1007 configured to store the data. The data may be processed or non-processed data and/or information relating thereto. The memory 1007 may comprise one or more memory units. Further, the memory 1007 may be a computer data storage or a semiconductor memory such as a computer memory, a read-only memory, a volatile memory or a non-volatile memory. The memory is arranged to be used to store obtained information, data, configurations, schedulings, and applications etc. to perform the methods herein when being executed in the wireless device 304.

Embodiments herein for providing location information to the RNN 306 or the network node 308,310 may be implemented through one or more processors, such as the processor 1008 in the arrangement depicted in FIG. 10b, together with computer program code for performing the functions and/or method actions of embodiments herein. The program code mentioned above may also be provided as a computer program product, for instance in the form of a data carrier carrying computer program code for performing the embodiments herein when being loaded into the wireless device 304. One such carrier may be in the form of an electronic signal, an optical signal, a radio signal or a computer readable storage medium. The computer readable storage medium may be a CD ROM disc or a memory stick.

The computer program code may furthermore be provided as program code stored on a server and downloaded to the wireless device 304.

Those skilled in the art will also appreciate that the input/output interface 1000, the receiving module 1001, the transmitting module 1002, the decoding module 1003, the configuring module 1004, the estimating module 1005 and the requesting module 1006 above may refer to a combination of analog and digital circuits, and/or one or more processors configured with software and/or firmware, e.g. stored in the memory 1007, that when executed by the one or more processors such as the processors in the wireless device 304 perform as described above. One or more of these processors, as well as the other digital hardware, may be included in a single Application-Specific Integrated Circuitry (ASIC), or several processors and various digital hardware may be distributed among several separate components, whether individually packaged or assembled into a System-on-a-Chip (SoC).

Examples of methods performed by the RNN 306 for providing location information to a network node 308,310 will now be described with reference to flowchart depicted in FIG. 11. The RNN 306 and the network node 308,310 are operating in the wireless communications network 300.

The methods comprise one or more of the following actions. It should be understood that these actions may be taken in any suitable order and that some actions may be combined.

Action 1101

The RNN 306 may receive from a wireless device 304 operating in the wireless communications network 300 a beacon identity. The beacon identity may be an identity of a beacon in reach by the wireless device 304.

Action 1102

The RNN 306 receives, from the network node 308,310, a first BLI request associated with the wireless device 304 operating in the wireless communications network 300.

Action 1103

The RNN 306 sends a second BLI request to the wireless device 304.

Action 1104

The RNN 306 receives BLI from the wireless device 304. The BLI comprises information relating to a location of a beacon 302, which beacon 302 is located in reach by the wireless device 304. Thereby, the RNN 306 will have knowledge about the location of the beacon 302 and thus also knowledge about the location of the wireless device 304.

Action 1105

The RNN 306 sends the BLI received from the wireless device 304 to the network node 308,310.

Action 1106

The RNN 306 may store a beacon identity and BLI for future use for the beacon 302. Thus, a beacon ID and BLI association may be stored.

Action 1107

In some embodiments, the RNN 306 determines a position of the wireless device 304 based on BLI received from the wireless device 304. For example, the RNN 306 may give the beacon location as an estimation of the wireless device's 304 position. This would be similar to a Cell Identity (CID) method used in positioning of wireless networks in which the location of the wireless device's 304 serving cell is given as the estimation of the wireless device's position.

Action 1108

The RNN 306 may store the determined position of the wireless device 304.

Action 1109

In some embodiments, the RNN 306 receives, from the wireless device 304, a received signal strength estimate of the beacon 302. Based on the received signal strength estimate, the RNN 306 may determine the distance between the wireless device and the beacon.

Action 1110

The RNN 306 may receive, from the wireless device 304, a range estimate or a round-trip time estimate of the beacon 302. Based on the range estimate or the round-trip estimate, the RNN 306 may determine the distance between the wireless device and the beacon.

To perform the method for providing location information to the network node 308,310, the RNN 306 may be configured according to an arrangement depicted in FIGS. 12a and 12b. The RNN 306 and the network node 308,310 are operating in the wireless communications network 300.

Embodiments described herein are also related to the RNN 306, such as a base station, as schematically illustrated in FIGS. 12a and 12b. According to some embodiments, cf. e.g. FIG. 12a, the RNN 306 comprises radio circuitry to communicate with one or more served wireless devices 304, communication circuitry to communicate with one or more other radio network nodes, e.g. the RNN, 306 and one or more network nodes 308,310, memory to store information related to the invention, and a processing unit, sometimes also referred to as a processing module or a processor.

The radio circuitry may be configured to send messages to the wireless device 304 comprising measurement configurations, BLI requests etc, and to receive messages from the wireless device 304 comprising measurement reports, beacon ID reports BLI reports, etc.

The communication circuitry may be configured to receive BLI requests from a network node 308,310 with respect to a beacon ID. It is also configured to report beacon IDs, BLI, etc. to a network node 308,310.

The processing unit may be configured to receive a beacon ID from a wireless device 304 via the radio circuitry, compare the received beacon ID to beacon IDs stored in memory, and determine whether there exists an association between a beacon ID and BLI in memory. The processing unit may also be configured to receive a beacon ID and a BLI from a wireless device 304 via the radio circuitry and make an association between the received beacon ID and location information, and send the association to memory for storage.

The memory may be configured to store associations between beacon IDs and BLI.

According to some embodiments, cf. FIG. 12b, the RNN 306 comprises means configured to perform one or more of the actions mentioned above as being performed by the processing unit. For example, the RNN 306 may comprise an input/output interface 1200, a receiving module 1201 and a transmitting module 1202 configured to realise the communication described above or parts thereof. In some embodiments, the radio network node 306 may comprise one or more modules or units, such as a comparing module 1203, a determining module 1204, an associating module 1205, etc., configured to perform one or more of the actions mentioned above as being performed by the processing unit 1207. These modules will now be described in more detail.

The RNN 306 is configured to receive, by means of the receiving module 1201 configured to receive, a BLI request from one or more network nodes, e.g. the network node 308,310. The receiving module 1201 may be implemented by or arranged in communication with the processor 1207 of the RNN 306. The processor 1207 will be described in more detail below.

The RNN 306 is configured to receive, from the network node 308,310 a first BLI request associated with the wireless device 304 operating in the wireless communications network 300.

Further. The RNN 306 is configured to receive BLI from the wireless device 304. The BLI comprises information relating to a location of a beacon 302, which beacon 302 is located in reach by the wireless device 304.

In some embodiments, the RNN 306 is configured to receive, from the wireless device 304, a received signal strength estimate of the beacon 302.

RNN 306 may be configured to receive, from the wireless device 304, a range estimate or a round-trip time estimate of the beacon 302.

The RNN 306 is configured to transmit, by means of a transmitting module 1202 configured to transmit a BLI request to one or one or more wireless devices, e.g. the wireless device 304. The transmitting module 1202 may be implemented by or arranged in communication with the processor 1207 of the RNN 306.

The RNN 306 is configured to send a second BLI request to the wireless device 304.

Further, the RNN 306 is configured to send the BLI received from the wireless device 304 to the network node 308,310.

The RNN 306 may be configured to compare, by means of a comparing module 1203 configured to compare a received beacon ID with stored beacon IDs. The comparing module 1203 may be implemented by or arranged in communication with the processor 1207 of the RNN 306.

The RNN 306 may be configured to determine, by means of a determining module 1204 configured to determine a position of the wireless device 304 based on BLI received from the wireless device 304. The determining module 1204 may be implemented by or arranged in communication with the processor 1207 of the RNN 306.

The RNN 306 may be configured to associate, by means of an associating module 1205 configured to associate a beacon identity with BLI. The associating module 1205 may be implemented by or arranged in communication with the processor 1207 of the RNN 306.

The RNN 306 may also comprise means for storing data such as one or more beacon identities and beacon location information. In some embodiments, the RNN 306 comprises a memory 1206 configured to store the data. The data may be processed or non-processed data and/or information relating thereto. The memory 1206 may comprise one or more memory units. Further, the memory 1206 may be a computer data storage or a semiconductor memory such as a computer memory, a read-only memory, a volatile memory or a non-volatile memory. The memory is arranged to be used to store obtained information, data, configurations, schedulings, and applications etc. to perform the methods herein when being executed in the RNN 306.

Embodiments herein for providing location information to the network node 308,310 may be implemented through one or more processors, such as the processor 1207 in the arrangement depicted in FIG. 12b, together with computer program code for performing the functions and/or method actions of embodiments herein. The program code mentioned above may also be provided as a computer program product, for instance in the form of a data carrier carrying computer program code for performing the embodiments herein when being loaded into the RNN 306. One such carrier may be in the form of an electronic signal, an optical signal, a radio signal or a computer readable storage medium. The computer readable storage medium may be a CD ROM disc or a memory stick.

The computer program code may furthermore be provided as program code stored on a server and downloaded to the RNN 306.

Those skilled in the art will also appreciate that the input/output interface 1200, the receiving module 1201, the transmitting module 1202, the comparing module 1203, the determining module 1204 and the associating module 1205 above may refer to a combination of analog and digital circuits, and/or one or more processors configured with software and/or firmware, e.g. stored in the memory 1206, that when executed by the one or more processors such as the processors in the RNN 306 perform as described above. One or more of these processors, as well as the other digital hardware, may be included in a single Application-Specific Integrated Circuitry (ASIC), or several processors and various digital hardware may be distributed among several separate components, whether individually packaged or assembled into a System-on-a-Chip (SoC).

Examples of methods performed by the network node 308,310 for receiving location information will now be described with reference to flowchart depicted in FIG. 13. The network node 308,310 is operating in the wireless communications network 300.

The methods comprise one or more of the following actions. It should be understood that these actions may be taken in any suitable order and that some actions may be combined.

Action 1301

The network node 308,310 receives a beacon identity associated with the beacon 302. The beacon identity identifies a beacon 302.

The network node 308,310 may receive the beacon identity from a wireless device 304 operating in a wireless communications network 300.

In some embodiments, the network node 308,310 receives the beacon identity from the RNN 306 operating in the wireless communications network 300.

Action 1302

The network node 308,310 compares the received beacon identity to stored beacon identities associated with BLI, wherein the BLI comprises information relating to a location of a beacon.

Action 1303

When the received beacon identity is excluded from the stored beacon identities, the network node 308,310 sends a BLI request.

In some embodiments, when the network node 308,310 receives the beacon identity from the wireless device 304, the network node 308,310 sends the BLI request to the wireless device 304.

In some embodiments, when the network node 308,310 receives the beacon identity from the radio network node 306 operating in the wireless communications network 300, the network node 308,310 sends the BLI request to the radio network node 306.

Action 1304

The network node 308,310 receives BLI in response to the BLI request. The BLI comprises information relating to a location of a beacon 302, which beacon 302 is located in reach by the wireless device 304.

Action 1305

The network node 308,310 may store a beacon identity and BLI for future use for the beacon 302.

Action 1306

In some embodiments, the network node 308,310 receives a received signal strength estimate of the beacon 302.

Action 1307

The network node 308,310 may receive a range estimate or a round-trip time estimate of the beacon 302.

Action 1308

In some embodiments, the network node 308,310 determines a position of the wireless device 304 based on received BLI. For example, the network node 308,310 may give the beacon location as an estimation of the wireless device's position. This would be similar to the CID method used in positioning of wireless networks in which the location of the wireless device's serving cell is given as the estimation of the wireless device's position.

Action 1309

The network node 308,310 may store the determined position of the wireless device 304.

To perform the method for receiving location information, the network node 308,310 may be configured according to an arrangement depicted in FIGS. 14a and 14b. The network node 308,310 is operating in the wireless communications network 300.

Thus, embodiments described herein are also related to a network node 308,310, such as an MME 308 or an E-SMLC 310, as schematically illustrated in FIGS. 14a and 14b. According to some embodiments, cf. e.g. FIG. 14a, the network node 308,310 is arranged with communication circuitry to communicate with RNNs 306 and other network nodes 308,310, memory to store information related embodiments described herein, and a processing unit, sometimes also referred to as a processing module or a processor.

The communication circuitry may be configured to send messages to the RNN 306 comprising measurement configurations, BLI requests etc., and to receive messages from the RNN comprising measurement reports, beacon ID reports, BLI reports, etc.

The processing unit may be configured to receive a beacon ID from the RNN 306 via the communication circuitry, compare to beacon IDs stored in memory, and determine whether there exists an association between a beacon ID and BLI in memory. The processing unit may also be configured to receive a beacon ID and a BLI from the RNN 306 via the communication circuitry and make an association between the received beacon ID and location information, and send the association to memory for storage.

The memory may be configured to store associations between beacon IDs and BLI.

According to some embodiments, cf. e.g. FIG. 14b, the network node 308,310 comprises means configured to perform one or more of the actions mentioned above as being performed by the processing unit. For example, the network node 308,310 may comprise an input/output interface 1400, a receiving module 1401 and a transmitting module 1402 configured to realise the communication described above or parts thereof. In some embodiments, the network node 308,310 comprises one or more modules or units, such as a comparing module 1403, a determining module 1404, an associating module 1405 etc., configured to perform one or more of the actions mentioned above as being performed by the processing unit 1407. These modules will now be described in more detail.

The network node 308,310 is configured to receive, by means of the receiving module 1401 configured to receive, a beacon identity associated with a beacon 302. The receiving module 1401 may be implemented by or arranged in communication with a processor 1407 of the network node 308,310. The processor 1407 will be described in more detail below.

The network node 308,310 is configured to receive BLI in response to a BLI request. The BLI comprises information relating to a location of the beacon 302, which beacon 302 is located in reach by the wireless device 304.

In some embodiments, the network node 308,310 is configured to receive the beacon identity from a wireless device 304 operating in the wireless communications network 300.

Alternatively, the network node 308,310 is configured to receive the beacon identity from the RNN 306 operating in the wireless communications network 300.

The network node 308,310 may further be configured to receive a received signal strength estimate of the beacon 302.

The network node 308,310 may be configured to receive a range estimate or a round-trip time estimate of the beacon 302.

The network node 308,310 is configured to transmit, by means of the transmitting module 1402 configured to transmit, a BLI request. The transmitting module 1402 may be implemented by or arranged in communication with the processor 1407 of the network node 308,310.

In some embodiments, when the network node 308,310 is configured to receive the beacon identity from the wireless device 304 operating in the wireless communications network 300, the network node 308,310 is configured to send BLI request to the wireless device 304.

Alternatively, when the network node 308,310 is configured to receive the beacon identity from the RNN 306 operating in the wireless communications network 300, the network node 308,310 is configured to send the BLI request to the radio network node 306.

The network node 308,310 may be configured to compare, by means of the comparing module 1403 configured to compare, the received beacon identity to stored beacon identities associated with BLI. The comparing module 1403 may be implemented by or arranged in communication with the processor 1407 of the network node 308,310.

The network node 308,310 may be configured to determine, by means of a determining module 1404 configured to determine a position of the wireless device 304 based on BLI received from the wireless device 304. The determining module 1404 may be implemented by or arranged in communication with the processor 1407 of the network node 308,310.

The network node 308,310 may be configured to associate, by means of an associating module 1405 configured to associate, a received beacon ID and BLI. The associating module 1405 may be implemented by or arranged in communication with the processor 1407 of the network node 308,310.

The network node 308,310 may also comprise means for storing data such as one or more beacon identities and beacon location information. In some embodiments, the RNN 306 comprises a memory 1406 configured to store the data. The data may be processed or non-processed data and/or information relating thereto. The memory 1406 may comprise one or more memory units. Further, the memory 1406 may be a computer data storage or a semiconductor memory such as a computer memory, a read-only memory, a volatile memory or a non-volatile memory. The memory is arranged to be used to store obtained information, data, configurations, schedulings, and applications etc. to perform the methods herein when being executed in the network node 308,310.

Embodiments herein for receiving location information may be implemented through one or more processors, such as the processor 1407 in the arrangement depicted in FIG. 14*b*, together with computer program code for performing the functions and/or method actions of embodiments herein. The program code mentioned above may also be provided as a computer program product, for instance in the form of a data carrier carrying computer program code for performing the embodiments herein when being loaded into the network node 308,310. One such carrier may be in the form of an electronic signal, an optical signal, a radio signal or a computer readable storage medium. The computer readable storage medium may be a CD ROM disc or a memory stick.

The computer program code may furthermore be provided as program code stored on a server and downloaded to the RNN 306.

Those skilled in the art will also appreciate that the input/output interface 1400, the receiving module 1401, the transmitting module 1402, the comparing module 1403, the determining module 1404 and the associating module 1405 above may refer to a combination of analog and digital circuits, and/or one or more processors configured with software and/or firmware, e.g. stored in the memory 1406, that when executed by the one or more processors such as the processors in the network node 308,310 perform as described above. One or more of these processors, as well as the other digital hardware, may be included in a single Application-Specific Integrated Circuitry (ASIC), or several processors and various digital hardware may be distributed among several separate components, whether individually packaged or assembled into a System-on-a-Chip (SoC).

EMBODIMENTS

Embodiment 1

A method in a wireless device 304 to provide BLI to a network node, e.g. a RNN 306, comprising receiving a request for BLI, retrieving the BLI from a beacon 302, reporting the BLI to a network node 308,310.

Embodiment 2

The method according to embodiment 1, wherein the wireless device 304 first retrieves a beacon identity and reports the beacon identity to the network node before retrieving the BLI.

Embodiment 3

The method according to embodiment 1, wherein the request for BLI comprises a beacon identity.

Embodiment 4

The method according to embodiment 2, wherein the network node, e.g. the RNN 306, indicates in the BLI request that the request is associated to a specific beacon identity.

Embodiment 5

The method according to embodiment 1, wherein the retrieving step comprising sending to the beacon 302 a BLI request.

Embodiment 6

A method in a RNN 306 receiving a BLI request associated to a wireless device 304 from a network node 308,310, sending a BLI request to the wireless device 304, receiving BLI from the wireless device 304, sending the BLI associated to the wireless device 304 to the network node 308,310.

Embodiment 7

A method in a network node 306,308,310, comprising receiving a beacon identity, comparing the beacon identity to stored beacon identities associated to BLI, if not match is found, sending a BLI request.

Embodiment 8

The method according to embodiment 7, wherein the network node is a RNN 306, and the beacon identity is received from a wireless device 304, and the BLI request is sent to the same wireless device 304.

Embodiment 9

The method according to embodiment 7, wherein the network node is a core network node 308 associated to a RNN 306, and the beacon identity is received from the RNN 306, and the BLI request is sent to the same RNN 306.

Embodiment 10

The method according to any of the above embodiments, wherein the measurement report from the wireless device 304 comprises a received signal strength estimate.

Embodiment 11

The method according to any of the above embodiments, wherein the measurement report from the wireless device 304 comprises range or round-trip time estimate.

Embodiment 12

The method according to any of the above embodiments, wherein the wireless device 304 retrieves a mobility indicator from the beacon 302, and in consideration of the mobility indicator determines to retrieve the BLI.

According to some embodiments herein, the network node is a RNN 306 or a network node such as an E-SMLC 310.

According to some embodiments herein, the UE indoor position estimation is based on one or several BLI sent from the wireless device 304 to the aforementioned network node.

According to some embodiments herein, the position information is sent and stored in the RNN 306 instead of the core network node 308.

According to some embodiments herein, the beacon ID and location information are stored at the network node for future use for the same beacon 302.

According to some embodiments herein, the beacons 302, which may be Wi-Fi or Bluetooth, regularly or irregularly transmit their ID and location information to the UE 304.

According to some embodiments herein, the wireless device 304 may send the received signal strength of the beacon 302 to the network node 306,308,310.

According to some embodiments herein, the wireless device 304 may send the range estimation of the beacon 302 to the network node 306,308,310.

When using the word "comprise" or "comprising" it shall be interpreted as non-limiting, i.e. meaning "consist at least of".

The embodiments herein are not limited to the above described preferred embodiments. Various alternatives, modifications and equivalents may be used. Therefore, the above embodiments should not be taken as limiting the scope of the invention, which is defined by the appending claims.

| Abbreviation | Explanation |
| --- | --- |
| A-GNSS | Assisted - Global Navigation Satellite System |
| BLI | Beacon Location Information |
| CGI | Cell Global Identity |
| DM | Domain Manager |
| E-CID | Enhanced-Cell ID |
| eNB | enhanced Node B |
| E-SMLC | Evolved-Serving Mobile Location Centre |
| GAD | Global Area Description |
| GPS | Global Positioning System |
| LPP | LTE Positioning Protocol |
| NE | Network Element |
| NM | Network Manager |
| OTDOA | Observed Time Difference of Arrival |
| RAT | Radio Access Technology |
| RFPM | Radio Frequency Pattern Matching |
| RRC | Radio Resource Control |
| UTDOA | Uplink Time Difference of Arrival |

The invention claimed is:

1. A method performed by a wireless device for providing location information to a Radio Network Node (RNN) or a network node, wherein the wireless device, the RNN and the network node are operating in a wireless communications network, and wherein the method comprises:
   receiving, from the RNN or the network node, a request for Beacon Location Information (BLI);
   obtaining the requested BLI by receiving location information transmitted by a beacon located in reach of the wireless device, wherein the location information specifies a height of the beacon within a building; and
   transmitting the received location information to the radio network node or the network node.

2. The method of claim 1, further comprising:
   obtaining a beacon identity from the beacon; and
   transmitting the beacon identity to the RNN or the network node.

3. The method of claim 2, wherein the transmitting of the beacon identity to the RNN or the network node is performed before the obtaining of BLI.

4. The method of claim 3, wherein the request for BLI comprises the beacon identity.

5. The method of claim 1, wherein the obtaining of BLI from the beacon comprises sending a BLI request to the beacon.

6. The method of claim 1, further comprising:
transmitting, to the RNN or the network node, a received signal strength estimate of the beacon.

7. The method of claim 1, further comprising:
transmitting, to the RNN or the network node, a range estimate or a round-trip time estimate of the beacon.

8. The method according to claim 1, wherein the obtaining of BLI from the beacon comprises:
obtaining a mobility indicator from the beacon, and
determining to retrieve BLI based on the obtained mobility indicator.

9. A wireless device for providing location information to a Radio Network Node (RNN) or a network node, wherein the wireless device, the RNN and the network node are configured to operate in a wireless communications network, and wherein the wireless device comprises radio circuitry and a processing circuit configured to:
receive, from the RNN or the network node, a request for Beacon Location Information, (BLI);
obtain BLI from a beacon by receiving location information transmitted by a beacon located in reach of the wireless device, wherein the location information specifies a height of the beacon within a building; and
transmit the obtained location information to the RNN or the network node.

10. The wireless device of claim 9, wherein the radio circuitry and processing circuit are further configured to:
obtain a beacon identity from the beacon; and
transmit the beacon identity to the RNN or the network node.

11. The wireless device of claim 10, wherein the radio circuitry and processing circuit are configured to transmit the beacon identity to the RNN or the network node before obtaining BLI.

12. The wireless device of claim 9, wherein the request for BLI comprises the beacon identity.

13. The wireless device of claim 9, wherein the radio circuitry and processing circuit are configured to obtain BLI from the beacon by being configured to send to the beacon a BLI request.

14. The wireless device of claim 9, wherein the radio circuitry and processing circuit are configured to transmit, to the RNN or the network node, a received signal strength estimate of the beacon.

15. The wireless device of claim 9, wherein the radio circuitry and processing circuit are configured to transmit, to the RNN or the network node, a range estimate or a round-trip time estimate of the beacon.

16. The wireless device of claim 9, wherein the radio circuitry and processing circuit are configured to obtain BLI from the beacon by being configured to:
obtain a mobility indicator from the beacon, and
determine to retrieve BLI based on the obtained mobility indicator.

17. A method performed by a Radio Network Node (RNN) for providing location information to a network node, wherein the RNN and the network node are operating in a cellular communications network, and wherein the method comprises:
receiving, from the network node a first Beacon Location Information (BLI) request associated with a wireless device operating in the cellular communications network;
sending a second BLI request to the wireless device, the second BLI request indicating that the wireless device shall retrieve, from a beacon located in reach by the wireless device, location information that specifies a height of the beacon within a building, and report the location information to the RNN;
receiving the location information from the wireless device; and
sending the location information received from the wireless device to the network node.

18. The method of 17, further comprising:
storing a beacon identity and the location information for future use for the beacon.

19. The method of claim 17, further comprising:
determining a position of the wireless device based on the location information received from the wireless device.

20. The method of claim 19, further comprising:
storing the determined position of the wireless device.

21. The method of claim 17, further comprising:
receiving, from the wireless device, a received signal strength estimate of the beacon.

22. The method of claim 17, further comprising:
receiving, from the wireless device, a range estimate or a round-trip time estimate of the beacon.

23. A Radio Network Node (RNN) for providing location information to a network node, wherein the RNN and the network node are configured to operate in a cellular communications network, and wherein the RNN comprises radio circuitry, communication circuitry, and a processing circuit, wherein the processing circuit is configured to:
receive from the network node, via the communication circuitry, a first Beacon Location Information (BLI) request associated with a wireless device operating in the cellular communications network;
send a second BLI request to the wireless device, via the radio circuitry, the second BLI request indicating that the wireless device shall retrieve, from a beacon located in reach by the wireless device, location information that specifies a height of the beacon within a building, and report the location information to the RNN;
receive the location information from the wireless device, via the radio circuitry; and
send the location information received from the wireless device to the network node, via the communication circuitry.

24. The RNN of claim 23, wherein the processing circuit is further configured to:
receive from the wireless device, via the radio circuitry, a received signal strength estimate of the beacon.

25. The RNN of claim 23, wherein the processing circuit is further configured to:
receive from the wireless device, via the radio circuitry, a range estimate or a round-trip time estimate of the beacon.

26. The RNN of claim 23, wherein the processing circuit is further configured to:
determine a position of the wireless device based on the location information received from the wireless device.

27. The RNN of claim 26, wherein the processing circuit is further configured to:
store the estimated position of the wireless device.

28. The RNN of claim 23, wherein the processing circuit is further configured to:

store a beacon identity and beacon location information for future use for the beacon.

29. A method performed by a network node for receiving location information, wherein the network node is operating in a cellular communications network, and wherein the method comprises:
receiving a beacon identity associated with a beacon, which beacon is located in reach by
a wireless device operating in the cellular communications network;
comparing the received beacon identity to stored beacon identities associated with Beacon Location Information (BLI), wherein the BLI comprises location information that specifies a height of a beacon within a building;
when the received beacon identity is excluded from the stored beacon identities, sending a BLI request indicating that the wireless device shall retrieve location information from the beacon associated with the beacon identity and report the location information, and receiving the location information in response to the BLI request.

30. The method of claim 29, wherein the receiving of the beacon identity comprises receiving the beacon identity from the wireless device, and wherein the sending of the BLI request comprises sending the BLI request to the wireless device.

31. The method of claim 30, wherein the receiving of the beacon identity comprises receiving the beacon identity from a RNN operating in the cellular communications network, and wherein the sending of the BLI request comprises sending the BLI request to the RNN.

32. The method of claim 29, further comprising:
storing a beacon identity and the location information for future use for the beacon.

33. The method of claim 29, further comprising:
receiving a received signal strength estimate of the beacon.

34. The method of claim 29, further comprising:
receiving a range estimate or a round-trip time estimate of the beacon.

35. The method of claim 29, further comprising:
determining a position of the wireless device based on received the location information.

36. A network node for receiving location information, wherein the network node is configured to operate in a cellular communications network, and wherein the network node comprises communication circuitry and a processing circuit configured to:
receive a beacon identity associated with a beacon, which beacon is located in reach by a wireless device operating in the cellular communications network;
compare the received beacon identity to stored beacon identities associated with Beacon Location Information, BLI, wherein the BLI comprises location information that specifies a height of a beacon within a building;
when the received beacon identity is excluded from the stored beacon identities, send a BLI request indicating that the wireless device shall retrieve location information from the beacon associated with the beacon identity and report the location information, and receive the location information in response to the BLI request.

37. The network node of claim 36, wherein the network node is configured to receive the beacon identity by further being configured to:
receive the beacon identity from the wireless device; and wherein the network node is configured to send the BLI request by further being configured to:
send the BLI request to the wireless device.

38. The network node of claim 36, wherein the network node is configured to receive the beacon identity by further being configured to:
receive the beacon identity from a RNN operating in the cellular communications network; and wherein the network node is configured to send the BLI request by further being configured to:
send the BLI request to the RNN.

39. The network node of claim 36, further being configured to:
receive a received signal strength estimate of the beacon.

40. The network node of claim 36, further being configured to:
receive a range estimate or a round-trip time estimate of the beacon.

41. The network node of claim 36, further being configured to:
determine a position of the wireless device based on received the location information.

42. The network node of claim 36, further being configured to:
store a beacon identity and the location information for future use for the beacon.

* * * * *